United States Patent
Gogna et al.

(10) Patent No.: US 11,209,822 B2
(45) Date of Patent: Dec. 28, 2021

(54) TECHNIQUES FOR CONTACTING A TELEOPERATOR

(71) Applicant: Zoox, Inc., Foster City, CA (US)

(72) Inventors: Ravi Gogna, San Jose, CA (US); Meredith James Goldman, Redwood City, CA (US); Paul Orecchio, Cupertino, CA (US)

(73) Assignee: Zoox, Inc., Foster City, CA (US)

( * ) Notice: Subject to any disclaimer, the term of this patent is extended or adjusted under 35 U.S.C. 154(b) by 257 days.

(21) Appl. No.: 16/457,289

(22) Filed: Jun. 28, 2019

(65) Prior Publication Data

US 2020/0409363 A1 Dec. 31, 2020

(51) Int. Cl.
| | |
|---|---|
| *G08G 1/16* | (2006.01) |
| *G05D 1/00* | (2006.01) |
| *G08G 1/01* | (2006.01) |
| *G05D 1/02* | (2020.01) |

(52) U.S. Cl.
CPC ......... *G05D 1/0088* (2013.01); *G05D 1/0011* (2013.01); *G05D 1/0214* (2013.01); *G05D 1/0276* (2013.01); *G08G 1/0112* (2013.01); *G08G 1/0133* (2013.01); *G05D 2201/0213* (2013.01)

(58) Field of Classification Search
CPC .. G05D 1/0088; G05D 1/0011; G05D 1/0276; G05D 1/0214; G05D 2201/0213; G05D 1/0027; G05D 1/00; G08G 1/0112; G08G 1/0133; G08G 1/16; B60W 30/00; B60W 30/09; B60W 30/10; B60W 30/16; B60W 30/085
See application file for complete search history.

(56) References Cited

U.S. PATENT DOCUMENTS

| | | | |
|---|---|---|---|
| 7,756,614 B2 * | 7/2010 | Jouppi | G05D 1/0011 701/25 |
| 10,019,011 B1 | 7/2018 | Green et al. | |
| 10,890,912 B2 * | 1/2021 | Cavender-Bares | A01C 21/002 |

(Continued)

OTHER PUBLICATIONS

PCT Search Report and Written Opinion dated Sep. 22, 2020 for PCT Application No. PCT/US2020/039397, 15 pages.

(Continued)

*Primary Examiner* — Yonel Beaulieu
(74) *Attorney, Agent, or Firm* — Lee & Hayes, P.C.

(57) ABSTRACT

Techniques and methods for contacting a teleoperator. For instance, while navigating to a location, progress of an autonomous vehicle may stop. This may be caused by the autonomous vehicle yielding to another vehicle, such as at an intersection or when the other vehicle is located along a route of the autonomous vehicle. While yielding to the other vehicle, the autonomous vehicle may determine that the progress has stopped for a threshold amount of time. Additionally, in some circumstances, the autonomous vehicle may determine that the progress not been stopped due to traffic or a traffic light. Based at least in part on the determinations, the autonomous vehicle may send sensor data to the teleoperator, where the sensor data represents an environment for which the autonomous vehicle is located. Additionally, the autonomous vehicle may send an indication of the other vehicle to the teleoperator.

20 Claims, 10 Drawing Sheets

(56) References Cited

U.S. PATENT DOCUMENTS

| | | | |
|---|---|---|---|
| 2015/0332213 A1* | 11/2015 | Galluzzo | G06Q 10/087 |
| | | | 700/216 |
| 2017/0192423 A1 | 7/2017 | Rust et al. | |
| 2017/0262709 A1 | 9/2017 | Wellington et al. | |
| 2017/0285637 A1 | 10/2017 | Salinger | |
| 2018/0032949 A1* | 2/2018 | Galluzzo | B25J 11/00 |
| 2018/0050634 A1* | 2/2018 | White | A47L 9/2805 |
| 2018/0088583 A1* | 3/2018 | Wang | G05D 1/0088 |
| 2018/0147721 A1* | 5/2018 | Griffin | A47L 11/4011 |
| 2018/0224850 A1 | 8/2018 | Kroop et al. | |
| 2018/0267537 A1 | 9/2018 | Kroop et al. | |
| 2019/0255991 A1* | 8/2019 | White | B25J 9/00 |
| 2019/0329782 A1* | 10/2019 | Shalev-Shwartz | G08G 1/0145 |
| 2020/0409358 A1 | 12/2020 | Gogna et al. | |

OTHER PUBLICATIONS

Office Action for U.S. Appl. No. 16/457,341, dated Apr. 9, 2021, Gogna, "Techniques for Navigating Vehicles using Teleoperator Instructions", 14 pages.

Office Action for U.S. Appl. No. 16/457,341, dated Jul. 13, 2021, Gogna, "Techniques for Navigating Vehicles using Teleoperator Instructions", 23 pages.

* cited by examiner

TECHNIQUES FOR CONTACTING A TELEOPERATOR

BACKGROUND

An autonomous vehicle may navigate along designated routes or between waypoints. For example, when a control system receives a request from a user device to pick up the user at a location and provide transport to a destination location, the autonomous vehicle may receive, from the control system, instructions to navigate from the pickup location to the destination location. However, in some circumstances, progress of the autonomous vehicle navigating to the pickup location or the destination location may be stopped, such as by another vehicle. This may cause problems, such as delaying the autonomous vehicle or causing the autonomous vehicle to block the flow of traffic.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
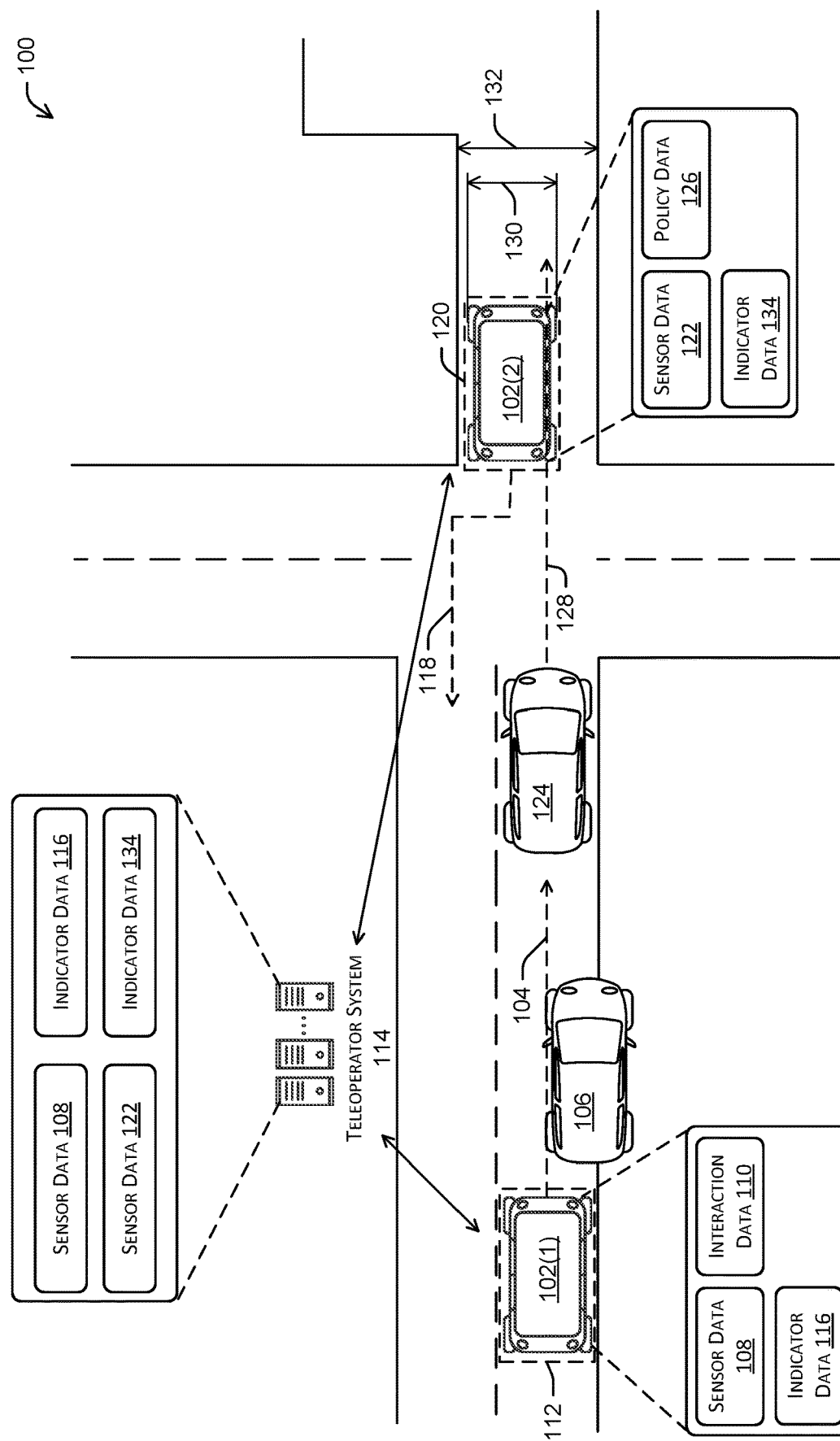
FIG. 1A is an example environment that includes autonomous vehicles determining when to contact a teleoperator, in accordance with embodiments of the disclosure.

As discussed above, an autonomous vehicle may navigate along designation routes or between waypoints, such as by navigating from a pickup location to a destination location. However, in some circumstances, progress of the autonomous vehicle may be impeded. For a first example, the autonomous vehicle may store data representing a policy instructing the autonomous vehicle to yield to other vehicles that arrive at an intersection before the autonomous vehicle. If the autonomous vehicle is yielding to another vehicle at an intersection, where the other vehicle is not moving for one or more reasons (e.g., the other vehicle cannot navigate along a route until the autonomous vehicle moves due to an obstruction or narrow road), then the progress of the autonomous vehicle may be impeded. For a second example, the autonomous vehicle may set an interaction associated with another vehicle, where the interaction causes the autonomous vehicle to follow the other vehicle. If the other vehicle stops, such as by parking or breaking down, then the progress of the autonomous vehicle may be impeded.

As such, this application describes techniques for determining when to contact a teleoperator as well as techniques for navigating the autonomous vehicle using instructions that are received from the teleoperator. For example, when progress of the autonomous vehicle is impeded, the autonomous vehicle may determine an amount of time that the progress has been impeded. The autonomous vehicle may then determine whether the amount of time satisfies (e.g., is equal to or greater than) a threshold amount of time. The threshold amount of time may include, but is not limited to, three seconds, thirty seconds, one minute, three minutes, and/or any other period of time. If the autonomous vehicle determines that the amount of time does not satisfy (e.g., is below) the threshold amount of time, then the autonomous vehicle may determine not to contact the teleoperator. However, if the autonomous vehicle determines that the amount of time satisfies the threshold amount of time, then the autonomous vehicle may determine if the progress of the autonomous vehicle is impeded and/or the progress of the object is impeded due to an intervening condition.

For a first example, the autonomous vehicle may determine if the progress of the autonomous vehicle is impeded because of traffic. In some instances, the autonomous vehicle may make the determination based at least in part on determining whether progress of another vehicle, in addition to the vehicle that the autonomous vehicle is yielding to, is also impeded. For instance, when the autonomous vehicle is navigating along a multilane road, the autonomous vehicle may determine if progress of another vehicle in another lane has also impeded. If the autonomous vehicle determines that the progress of another vehicle has also impeded, then the autonomous vehicle may determine that traffic has caused the progress of the autonomous vehicle to be impeded. As such, the autonomous vehicle may determine not to contact the teleoperator. However, if the autonomous vehicle determines that the progress of another vehicle has not been impeded and/or there is not another vehicle next to the autonomous vehicle, then the autonomous vehicle may determine that traffic has not caused the progress of the autonomous vehicle to be impeded. As such, the autonomous vehicle may determine to contact the teleoperator.

For a second example, the autonomous vehicle may determine if the progress of the autonomous vehicle is impeded because of a traffic light. In some instances, the autonomous vehicle may use sensor data to determine if a traffic light is causing the progress of the autonomous vehicle to be impeded. Additionally, or alternatively, in some instances, the autonomous vehicle may use map data to determine if a traffic light is causing the progress of the autonomous vehicle to be impeded. In either instance, if the autonomous vehicle determines that a traffic light is causing the progress of the autonomous vehicle to be impeded, then the autonomous vehicle may determine not to contact the teleoperator. However, if the autonomous vehicle determines that a traffic light is not causing the progress of the autonomous vehicle to be impeded, then the autonomous vehicle may determine to contact the teleoperator.

When determining to contact the teleoperator, the autonomous vehicle may send sensor data to one or more computing devices associated with the teleoperator. The sensor data may include, but is not limited to, image data, light detection and ranging (lidar) data, radar data, and/or other types of sensor data representing the environment around the autonomous vehicle. In some instances, the autonomous vehicle may further send, to the one or more computing devices, data indicating which object(s) (e.g., vehicle(s), pedestrians, signs, construction equipment, etc.) are causing the progress of the autonomous vehicle to be impeded. For example, if the autonomous vehicle is yielding to another vehicle, the data may indicate that the autonomous vehicle is currently yielding to the other vehicle. In some instances, the autonomous vehicle may send, to the one or more computing devices, data indicating the amount of time that the progress of the autonomous vehicle has been impeded and/or the amount of time that the autonomous vehicle has been yielding to the object(s).

The one or more computing devices may receive the sensor data from the autonomous vehicle and, in response, display a user interface that includes content (e.g., image(s), video, etc.) represented by the sensor data. Additionally, the one or more computing devices may display graphical elements indicating which object(s) are causing the progress of the autonomous vehicle to be impeded. For example, the user interface may display a graphical element that indicates that the autonomous vehicle is yielding to an object. The teleoperator may then use the one or more computing devices to send instructions to the autonomous vehicle, where the instructions indicate how the autonomous vehicle is to proceed. In at least some examples, such instructions may comprise an instruction to disregard and/or alter a policy (e.g., disregard the yield instruction to a selected object in the environment).

For a first example, and if the autonomous vehicle is yielding to object(s) at an intersection, where the object(s) are not moving for one or more reasons, then the instructions may cause the autonomous vehicle to no longer yield to the object(s) and/or cause the autonomous vehicle to temporarily cease following (and/or alter) one or more policies. The one or more policies may include, but are not limited to, a first policy to yield to vehicles that arrive at an intersection before the autonomous vehicle, a second policy to travel in a road lane, and/or one or more additional policies. In some instances, temporarily ceasing following the one or more policies may include ceasing following the one or more policies for a period of time. The period of time may include, but is not limited to, five seconds, ten seconds, thirty seconds, one minute, and/or another period of time. Additionally, or alternatively, in some instances, temporarily ceasing following the one or more policies may include ceasing following the one or more policies until the autonomous vehicle navigates to a given location, navigates a given distance, navigates to a location at which the autonomous vehicle would no longer be yielding to the object(s), and/or the like. Regardless, using the instructions, the autonomous vehicle may determine to no longer yield to the object(s) and/or determine to temporarily cease following the one or more policies. As such, the autonomous vehicle may again begin navigating to a location.

For a second example, and if the autonomous vehicle is yielding to another vehicle for which the autonomous vehicle has a current interaction, such as "follow", then the instruction may cause the autonomous vehicle to change the interaction with the other vehicle. For instance, the instruction may cause the interaction to change from "follow" to "do not follow". Additionally, in some instances, the instruction may cause the autonomous vehicle to temporarily cease following one or more polices. For instance, the instructions may cause the autonomous vehicle to temporarily cease following the second policy, which includes traveling in a road lane, so that the autonomous vehicle can navigate around the other vehicle. Using the instructions, the autonomous vehicle may change the interaction and/or determine to temporarily cease following the one or more policies. As such, the autonomous vehicle may again begin navigating to a location.

In some instances, once the autonomous vehicle begins navigating after receiving the instructions, the autonomous vehicle may determine to once again yield to the object(s). For instance, the autonomous vehicle may determine to once again follow the one or more policies or change the interaction with the object(s) back to the original interaction setting. The autonomous vehicle may make the determination based at least in part on a movement of the object(s).

For a first example, the autonomous vehicle may determine that a velocity associated the object(s) has changed. For instance, the velocity may change from zero miles per hour to a velocity that is greater than zero miles per hour. Based at least in part on the change in the velocity, the autonomous vehicle may determine that the object(s) are starting to move. As such, the autonomous vehicle may determine to once again yield to the object(s) and/or change the interaction with the object(s) back to "follow". Additionally, in some instances, the autonomous vehicle may again contact the teleoperator.

For a second example, the object(s) may have originally been moving when the autonomous vehicle originally yielded to the object(s), however, the object(s) may have remained in a given area. For instance, the object(s) may include a construction vehicle (e.g., backhoe, paver, etc.) that is moving back-and-forth within the given area. In such an example, the instructions sent by the teleoperator may include a specified area around the object(s) for which the object(s) are expected to remain. If the object(s) move outside of the specified area, then the autonomous vehicle may determine to once again yield to the object(s). Additionally, the autonomous vehicle may once again contact the teleoperator.

While the examples described above include determining that the progress of the autonomous vehicle is impeded using policies and/or interactions, in other instances, the progress of the autonomous vehicle may be impeded based on one or more other factors. For a first example, the autonomous vehicle may determine that the progress is impeded based on identifying a specific type of object. For instance, the specific type of object may include a tractor and/or streetcleaner that navigates at a slow velocity. As such, the progress of the autonomous vehicle may be impeded when the specific type of object is located along the route of the autonomous vehicle. For a second example, the autonomous vehicle may determine that the progress is impeded based on identifying a specific type of scenario. The scenario may include, but is not limited to, another vehicle merging into the drive lane of the autonomous vehicle, another vehicle navigating at a velocity that is below a threshold velocity (which is described below), an accident that occurs along the route of the autonomous vehicle, and/or the like.

The examples above describe the autonomous vehicle as determining if "progress" of the autonomous vehicle has been impeded. In some instances, the autonomous vehicle may determine that the progress has been impeded based at least in part on determining that the autonomous vehicle has stopped at a location (e.g., the velocity of the autonomous vehicle is zero miles per hour). Additionally, or alternatively, in some instances, the autonomous vehicle may determine that the progress has been impeded based at least in part on determining that the autonomous vehicle is only navigating a give distance within a given amount of time. For example, the autonomous vehicle may determine that the progress has been impeded based at least in part on determining that the autonomous vehicle is navigating one foot per second, one foot per five seconds, one foot per minute, and/or the like. Additionally, or alternatively, in some instances, the autonomous vehicle may determine that the progress has been impeded based at least in part on determining that the current velocity of the autonomous vehicle is below a threshold velocity. The threshold velocity may include, but is not limited to, a half a mile per hour, a mile per hour, and/or any other velocity.

Additionally, the techniques may provide the teleoperator with contextual information of the situation at the autonomous vehicle so that the teleoperator may provide guidance to the autonomous vehicle. A teleoperations system may include one or more teleoperators, which may be human teleoperators, located at a teleoperations center. In some examples, one or more of the teleoperators may not be human, such as, for example, they may be computer systems leveraging artificial intelligence, machine learning, and/or other decision-making strategies. In some examples, the teleoperator may interact with one or more autonomous vehicles in a fleet of autonomous vehicles via a user interface that can include a teleoperator interface. The teleoperator interface may include one or more displays configured to provide the teleoperator with data related to operations of the autonomous vehicles. For example, the display(s) may be configured to show content related to sensor data received from the autonomous vehicles, content related to the road network, and/or additional content or information to facilitate providing assistance to the autonomous vehicles.

Additionally, or alternatively, the teleoperator interface may also include a teleoperator input device configured to allow the teleoperator to provide information to one or more of the autonomous vehicles, for example, in the form of teleoperation instructions providing guidance to the autonomous vehicles. The teleoperator input device may include one or more of a touch-sensitive screen, a stylus, a mouse, a dial, a keypad, a microphone, a touchscreen, and/or a gesture-input system configured to translate gestures performed by the teleoperator into input commands for the teleoperator interface. As explained in more detail herein, the teleoperations system may provide one or more of the autonomous vehicles with guidance to avoid, maneuver around, or pass through events, such as when progress of the autonomous vehicles has been impeded.

The techniques described herein can be implemented in a number of ways. Example implementations are provided below with reference to the following figures. Although discussed in the context of a vehicle, the methods, apparatuses, and systems described herein can be applied to a variety of systems.

FIG. 1A is an example environment 100 that includes autonomous vehicles 102(1)-(2) determining when to contact a teleoperator, in accordance with embodiments of the disclosure. For example, the first autonomous vehicle 102(1) may be navigating along a route 104. While navigating, the first autonomous vehicle 102(1) may encounter a vehicle 106 that is also navigating along the route 104. As such, the first autonomous vehicle 102(1) may use sensor data 108 generated by one or more sensors of the first autonomous vehicle 102(1) to identify the vehicle 106. Additionally, since the vehicle 106 is located in front of the first autonomous vehicle 102(1), and in the same driving lane as the first autonomous vehicle 102(1), the first autonomous vehicle 102(1) may set an interaction with the vehicle 106 as "follow", which is represented by the interaction data 110.

However, as the first autonomous vehicle 102(1) is navigating along the route 104 and following the vehicle 106, the vehicle 106 may stop for one or more reasons. For example, the vehicle 106 may breakdown, causing the vehicle 106 to at least partially obstruct the road, as illustrated in the example of FIG. 1A. As such, and since the first autonomous vehicle 102(1) is following the vehicle 106, the first autonomous vehicle 102(1) may also stop at a location 112 along the route 104. This may cause the first autonomous vehicle 102(1) to determine that the progress of the first autonomous vehicle 102(1) has been impeded.

While the progress is impeded, the first autonomous vehicle 102(1) may determine that an amount of time at which the progress has been impeded satisfies a threshold amount of time. The first autonomous vehicle 102(1) may further determine if the progress has been impeded due to an intervening condition (e.g., traffic, a traffic light, etc.). In the example of FIG. 1A, the first autonomous vehicle 102(1) may determine that the progress has not been impeded due to an intervening condition. Since the amount of time satisfies the threshold amount of time, and since the progress has not been impeded due to an intervening condition, the first autonomous vehicle 102(1) may determine to contact the teleoperator.

To contact the teleoperator, the first autonomous vehicle 102(1) may send, to a teleoperator system 114 associated with the teleoperator, at least a portion of the sensor data 108. For instance, the first autonomous vehicle 102(1) may send at least sensor data 108 (e.g., image data) representing the vehicle 106 and/or any derived data therefrom (e.g., detections, classifications, control data, etc.) to the teleoperator system 114. In some instances, the first autonomous vehicle 102(1) may further send, to the teleoperator system 114, indicator data 116 that indicates that the progress has been impeded due to the vehicle 106 and/or that the current interaction with the vehicle 106 includes "follow". The teleoperator may use the data received from the first autonomous vehicle 102(1) to provide guidance to the first autonomous vehicle 102(1), which is described in the example of FIG. 1B.

Additionally, in the example of FIG. 1A, the second autonomous vehicle 102(2) may be navigating along a route 118. While navigating, the second autonomous vehicle 102(2) may encounter an intersection, which causes the second autonomous vehicle 102(2) to stop at a location 120. Additionally, the second autonomous vehicle 102(2) may use sensor data 122 generated by one or more sensors of the second autonomous vehicle 102(2) to identify that the vehicle 124 arrived at the intersection before the second autonomous vehicle 102(2). As such, and based at least in part on a policy represented by the policy data 126, the second autonomous vehicle 102(2) may determine to yield to the vehicle 124 at the intersection.

However, the vehicle 124, which is navigating along a route 128, may be unable to advance along the route 128 until after the second autonomous vehicle 102(2) navigates along the route 118. This is because, based at least in part on a width 130 of the second autonomous vehicle 102(2) and a width 132 of a drive envelope along the route 128, the second autonomous vehicle 102(2) is at least partially obstructing the route 128 of the vehicle 124. As such, the vehicle 124 may continue to wait for the second autonomous vehicle 102(2) to navigate along the route 118 before the vehicle 124 navigates along the route 128. Since the second autonomous vehicle 102(2) is yielding to the vehicle 124, the progress of the second autonomous vehicle 102(2) may be impeded at the location 120.

While the progress is impeded, the second autonomous vehicle 102(2) may determine that an amount of time at which the progress has been impeded satisfies a threshold amount of time. The second autonomous vehicle 102(2) may further determine if the progress has been impeded due to an intervening condition (e.g., traffic, a traffic light, etc.). In the example of FIG. 1A, the second autonomous vehicle 102(2) may determine that the progress has not been impeded due to an intervening condition. Since the amount of time satisfies the threshold amount of time, and since the progress is has not been impeded due to an intervening condition, the second autonomous vehicle 102(2) may determine to contact the teleoperator.

To contact the teleoperator, the second autonomous vehicle 102(2) may send, to the teleoperator system 114 associated with the teleoperator, at least a portion of the sensor data 122 (and/or any data derived therefrom). For instance, the second autonomous vehicle 102(2) may send at least sensor data 122 (e.g., image data) representing the vehicle 124 to the teleoperator system 114. In some instances, the second autonomous vehicle 102(2) may further send, to the teleoperator system 114, indicator data 134 that indicates that the progress has been impeded due to the vehicle 124 and/or that the second autonomous vehicle 102(2) is currently yielding to the vehicle 124. Still, in some instances, the second autonomous vehicle 102(2) may send, to the teleoperator system 114, the policy data 126 indicating the policy that is causing the second autonomous vehicle 102(2) to yield to the vehicle 124. The teleoperator may then use the data received from the second autonomous vehicle 102(2) to provide guidance to the second autonomous vehicle 102(2), which is described in the example of FIG. 1B.

Figure 1B:
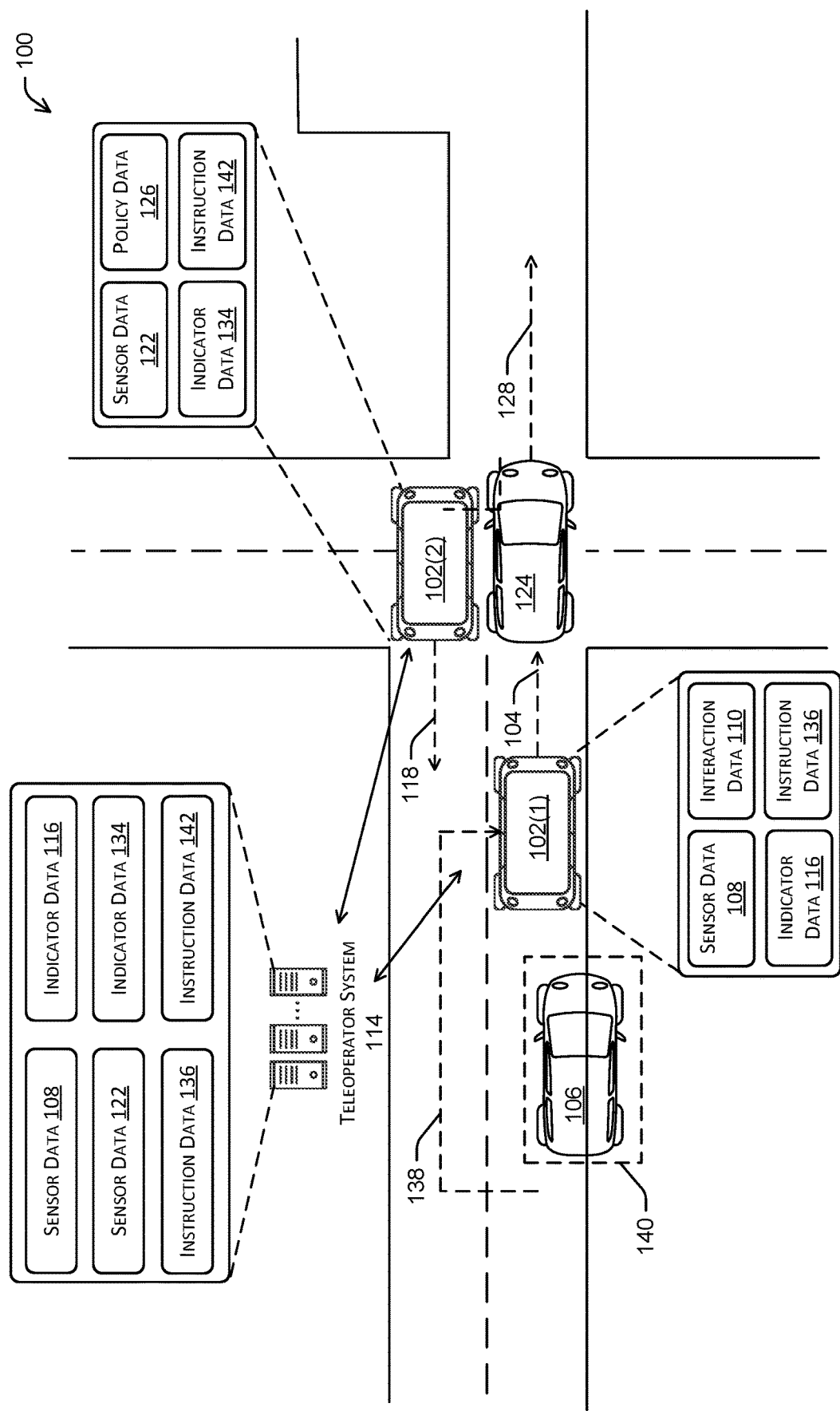
FIG. 1B is the example environment that now includes the autonomous vehicles receiving instructions from the teleoperator, in accordance with embodiments of the disclosure.

FIG. 1B is the example environment 100 that now includes the autonomous vehicles 102(1)-(2) receiving instructions from the teleoperator, in accordance with embodiments of the disclosure. For example, the teleoperator may interact with the autonomous vehicle 102(1)-(2) via a user interface that can include a teleoperator interface. The teleoperator interface may include one or more displays configured to provide the teleoperator with data related to operation of the autonomous vehicles 102(1)-(2). For example, the display(s) may be configured to show content (e.g., image(s)) related to the sensor data 108 received from the first autonomous vehicle 102(1). Additionally, the display(s) may be configured to shown content (e.g., image(s)) related to the sensor data 122 received from the second autonomous vehicle 102(2).

In some instances, the display(s) may further be configured to show content related to object(s) that are causing progresses of the autonomous vehicles 102(1)-(2) to be impeded. For example, the display(s) may use the indicator data 116 in order to show a graphical element indicating that it is the vehicle 106 that is causing the progress of the first autonomous vehicle 102(1) to be impeded. Additionally, the display(s) may use the indicator data 134 to show a graphical element indicating that it is the vehicle 124 that is causing the progress of the second autonomous vehicle 102(2) to be impeded. As described herein, a graphical element may include, but is not limited to, a bounding box around an object, shading an object, text describing the object, and/or any other graphical element that may indicate information about the object.

The teleoperator interface may also include a teleoperator input device configured to allow the teleoperator to provide information to the autonomous vehicles 102(1)-(2), for example, in the form of teleoperation instructions providing guidance to the autonomous vehicles 102(1)-(2). For example, the teleoperator may provide instructions, represented by the instruction data 136, for the first autonomous vehicle 102(1). The instructions may indicate that the first autonomous vehicle 102(1) is to change the interaction with the vehicle 106 from "follow" to "do not follow". In some instances, the instructions may further indicate that the first autonomous vehicle 102(1) may temporarily cease following one or more policies (and/or temporarily alter such policies), such as a policy specifying that the first autonomous vehicle 102(1) is to maintain a road lane, in order for the first autonomous vehicle 102(1) to navigate around the vehicle 106.

The first autonomous vehicle 102(1) may receive the instruction data 136 from the teleoperator system 114. Using the instruction data 136, the first autonomous vehicle 102(1) may update the interaction with the vehicle 106 to indicate "do not follow". Additionally, in some instances, the first autonomous vehicle 102(1) may temporarily cease following (or otherwise alter) the one or more policies. As such, and based at least in part on the instructions, the first autonomous vehicle 102(1) may determine a route 138 to get around the vehicle 106. After getting around the vehicle 106, the first autonomous vehicle 102(1) may again navigate along the route 104 of the first autonomous vehicle 102(1).

In some instances, while navigating along the route 138 to get around the vehicle 106, the first autonomous vehicle 102(1) may determine if the vehicle 106 begins moving. For example, the first autonomous vehicle 102(1) may use the sensor data 108 to determine if a velocity for the vehicle 106 changes from zero miles per hour to a velocity that is greater than zero miles per hour. In some instances, if the first autonomous vehicle 102(1) determines that the vehicle 106 begins moving, the first autonomous vehicle 102(1) may stop navigating along the route 138. Additionally, the first autonomous vehicle 102(1) may again update the interaction with the vehicle 106 to include "follow," thereby returning to the vehicle's nominal operating behavior.

Additionally, or alternatively, in some instances, the instructions from the teleoperator system 114 may indicate an area 140 around the vehicle 106. In such instances, while navigating along the route 138 to get around the vehicle 106, the first autonomous vehicle 102(1) may determine if the vehicle 106 moves outside of the area 140. For example, the first autonomous vehicle 102(1) may use the sensor data 108 to determine if at least a portion of the vehicle 106 moves to outside of the area 140. If the first autonomous vehicle 102(1) determines that the vehicle 106 moves outside of the area 140, the first autonomous vehicle 102(1) may stop navigating along the route 138. Additionally, the first autonomous vehicle 102(1) may again update the interaction with the vehicle 106 to include "follow".

Additionally, the teleoperator may provide instructions, represented by the instruction data 142, for the second autonomous vehicle 102(2). The instructions may indicate that the second autonomous vehicle 102(2) is to cease yielding for the vehicle 124. In some instances, the instructions may further indicate that the second autonomous vehicle 102(2) may temporarily cease following (or otherwise alter) one or more policies, such as a policy specifying that the second autonomous vehicle 102(2) is to yield to vehicles that arrive at intersections before the second autonomous vehicle 102(2).

The second autonomous vehicle 102(2) may receive the instruction data 142 from the teleoperator system 114. Using the instruction data 142, the second autonomous vehicle 102(2) may determine to no longer yield for the vehicle 124 at the intersection. Additionally, in some instances, the second autonomous vehicle 102(2) may temporarily cease following the one or more policies. As such, and based at least in part on the instructions, the second autonomous vehicle 102(2) may begin navigating along the route 118 before the vehicle 124 begins navigating along the route 128 in order to provide the vehicle 124 with room to navigate along the route 128. As shown in the example of FIG. 1B, after the second autonomous vehicle 102(2) begins to navigate along the route 118, the vehicle 124 may then begin to navigate along the route 128.

While the example of FIG. 1A describes the progress of the first autonomous vehicle 102(1) as being impeded based on the vehicle 106, which the first autonomous vehicle 102(1) is following stopping, in other examples, the progress of the first autonomous vehicle 102(1) may stop for other reasons. For example, first autonomous vehicle 102(1) may analyze the sensor data 108 and, based on the analysis, the first autonomous vehicle 102(1) may determine that the vehicle 106 includes a specific type of object. Based on the determination, the first autonomous vehicle 102(1) may determine that the progress is impeded. For a second example, the first autonomous vehicle 102(1) may analyze the sensor data 108 and, based on the analysis, the first autonomous vehicle 102(1) may determine that a velocity of the vehicle 106 is below a threshold velocity. Based on the determination, the first autonomous vehicle 102(1) may determine that the progress is impeded.

Figure 2:
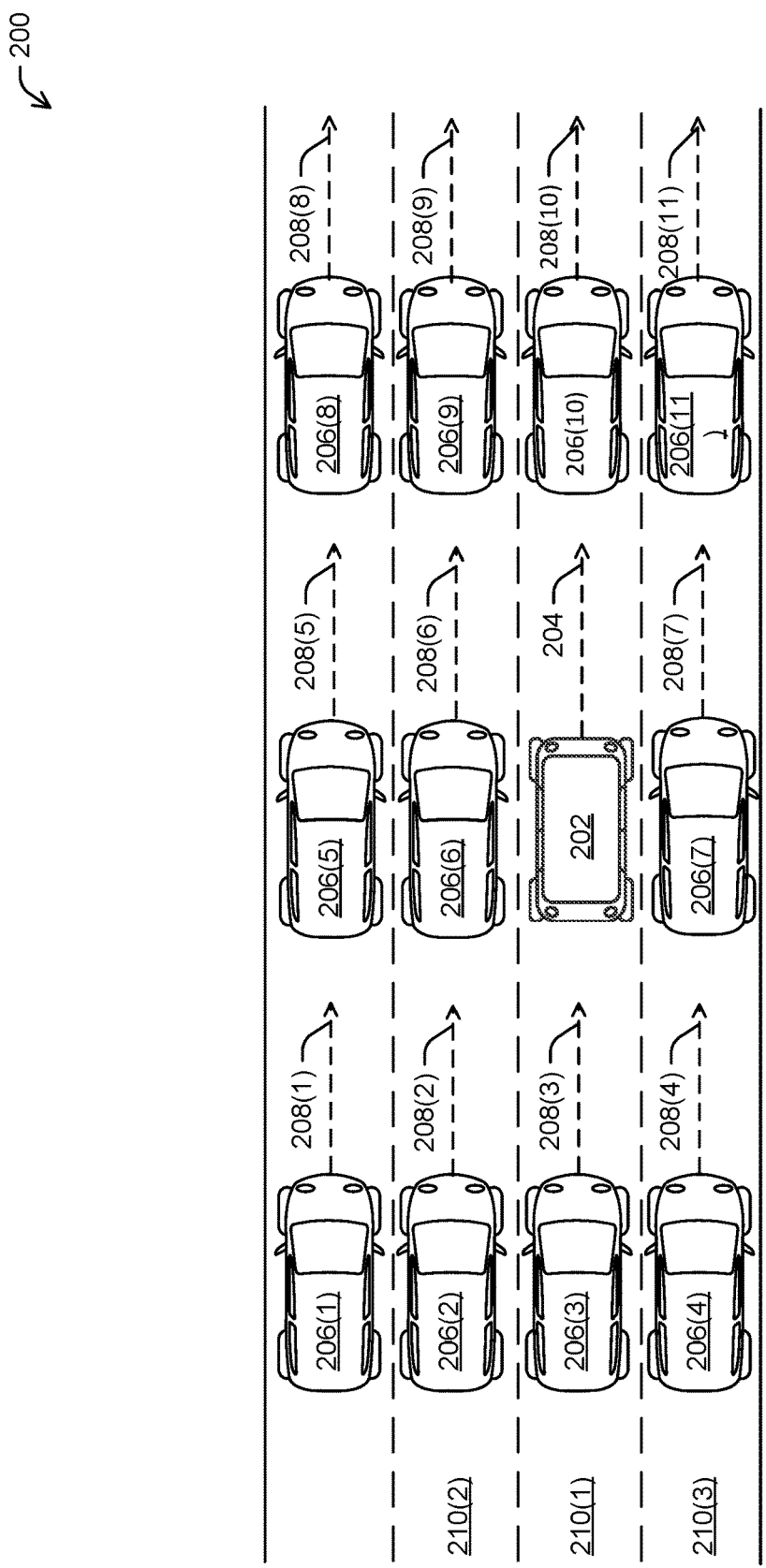
FIG. 2 is an example environment that includes an autonomous vehicle determining not to contact a teleoperator based at least in part on the autonomous vehicle being stuck in traffic, in accordance with embodiments of the disclosure.

FIG. 2 is an example environment 200 that includes an autonomous vehicle 202 determining not to contact a teleoperator based at least in part on the autonomous vehicle 202 being stuck in traffic, in accordance with embodiments of the disclosure. For instance, the autonomous vehicle 202 may be navigating along a route 204 on a road that includes more than one drive lane. In some instances, the autonomous vehicle 202 may use sensor data and/or map data to determine that the road includes more than two drive lanes. For a first example, the autonomous vehicle 202 may analyze the sensor data to identify marking on the road that indicate multiple drive lanes in the same direction. For a second examples, the autonomous vehicle 202 may analyze the sensor data to identify another vehicle navigating next to the autonomous vehicle 202 and in a same direction as the autonomous vehicle 202. For a third example, the map data may indicate that the road includes multiple drive lanes.

Additionally, other vehicles 206(1)-(11) may respectively be navigating along routes 208(1)-(11). While navigating, the autonomous vehicle 202 and the vehicles 206(1)-(11) may get stuck in traffic. For instance, the progress of the autonomous vehicle 202 may be impeded at a location along the route 204. Based at least in part on the progress being impeded, the autonomous vehicle 202 may determine whether to contact the teleoperator.

For instance, the autonomous vehicle 202 may determine that the progress has been impeded for a threshold amount of time. The autonomous vehicle 202 may then determine if the progress is impeded due to traffic. In some instances, to determine if the progress has been impeded due to traffic, the autonomous vehicle 202 may determine that the progress for at least one other vehicle located near the autonomous vehicle 202 and/or located near the vehicle 206(10) for which the autonomous vehicle 202 is following has also impeded.

For example, the autonomous vehicle 202 may be navigating in a first road lane 210(1). The autonomous vehicle 202 may determine that the progress of the vehicle 206(2) located in a second road lane 210(2), the progress of the vehicle 206(6) located in the second road lane 210(2), the progress of the vehicle 206(9) located in the second road lane 210(2), the progress of the vehicle 206(4) located in a third road lane 210(3), the progress of the vehicle 206(7) located in the third road lane 210(3), and/or the progress of the vehicle 206(11) located in the third road lane 210(3) has also been impeded. Based at least in part on the determination(s), the autonomous vehicle 202 may determine that the progress is impeded due to traffic. As such, the autonomous vehicle 202 may determine not to contact the teleoperator even though the progress of the autonomous vehicle 202 has been impeded for the threshold amount of time.

Figure 3:
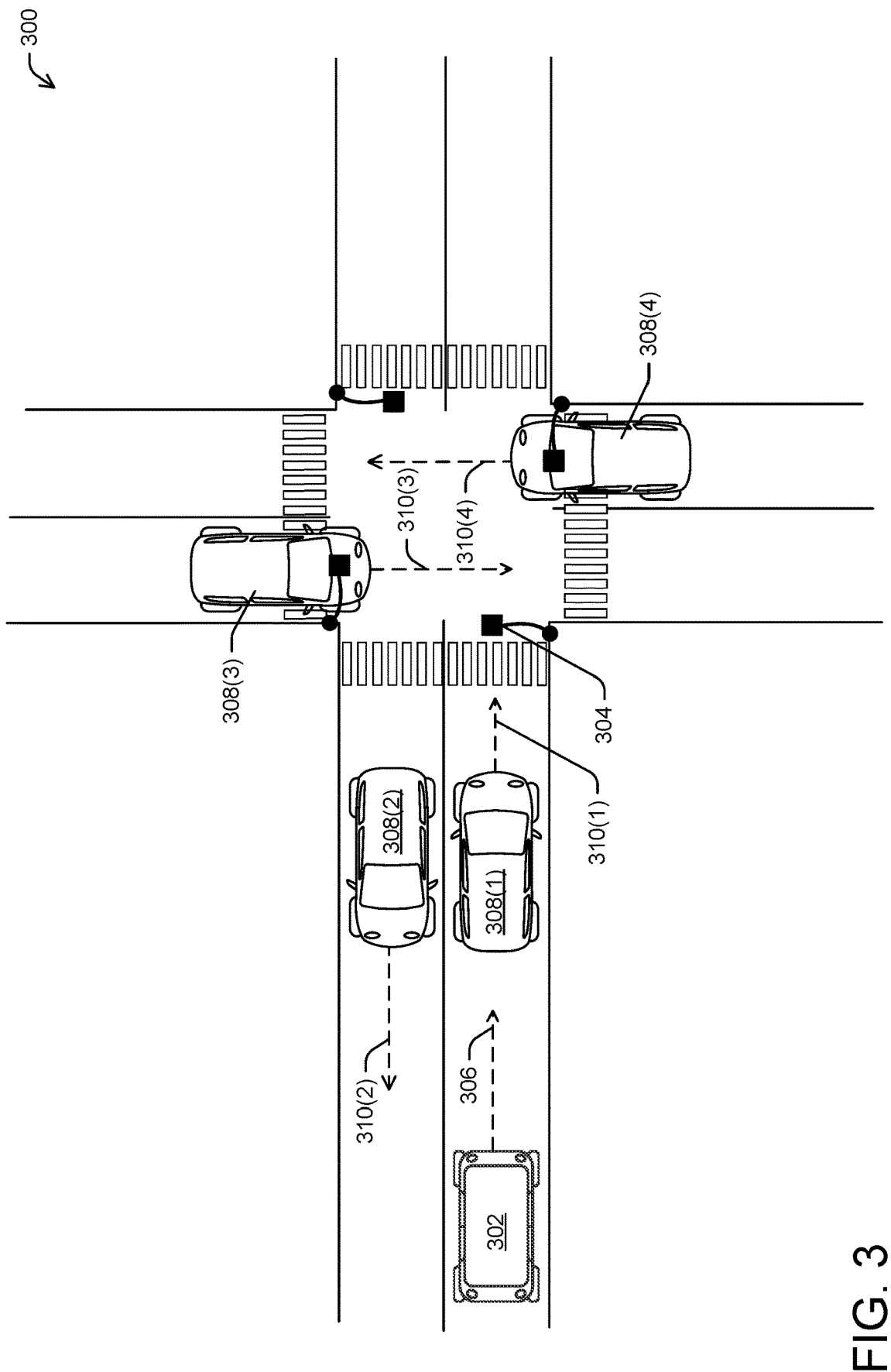
FIG. 3 is an example environment that includes an autonomous vehicle determining not to contact a teleoperator based at least in part on the progress of the autonomous vehicle being impeded due to a traffic light, in accordance with embodiments of the disclosure.

FIG. 3 is an example environment 300 that includes an autonomous vehicle 302 determining not to contact a teleoperator based at least in part on the progress of the autonomous vehicle 302 being impeded due to a traffic light 304, in accordance with embodiments of the disclosure. For instance, the autonomous vehicle 302 may be navigating along a route 306. Additionally, other vehicles 308(1)-(4) may respectively be navigating along routes 310(1)-(4). While navigating, the progress of the autonomous vehicle 302 may be impeded based at least in part on the autonomous vehicle 302 yielding to the vehicle 308(1), which also stopped. For instance, the vehicle 308(1) may be stopped because the traffic light 304 is red. Based at least in part on the progress being impeded, the autonomous vehicle 302 may determine whether to contact the teleoperator.

For instance, the autonomous vehicle 302 may determine that the progress has been impeded for a threshold amount of time. The autonomous vehicle 302 may then determine if the progress is impeded due to the traffic light 304. In some instances, to determine if the progress is stopped due to the traffic light 304, the autonomous vehicle 302 may analyze sensor data generated by the autonomous vehicle 302. Based at least in part on the analysis, the autonomous vehicle 302 may identify the traffic light 304 and determine that the traffic light 304 is currently red. As such, the autonomous vehicle 302 may determine that the progress is impeded due to the traffic light 304. In some instances, since the progress is impeded due to the traffic light 304, the autonomous vehicle 302 may determine not to contact the teleoperator even though the progress has been impeded for the threshold amount of time.

In a similar example, however, if such an environment 300 is devoid of traffic lights, the autonomous vehicle 302 may reason about how to proceed based on common practice or law dictating how to proceed through a four way stop (e.g., yield based on order of approach and/or to the vehicle to the right). In such an example, if the autonomous vehicle 302 has been yielding (according to the policy) to another vehicle (e.g., vehicle 308(4)) for a period of time greater than or equal to a threshold amount of time, the autonomous vehicle 302 may send a signal to a teleoperator for guidance.

Figure 4:
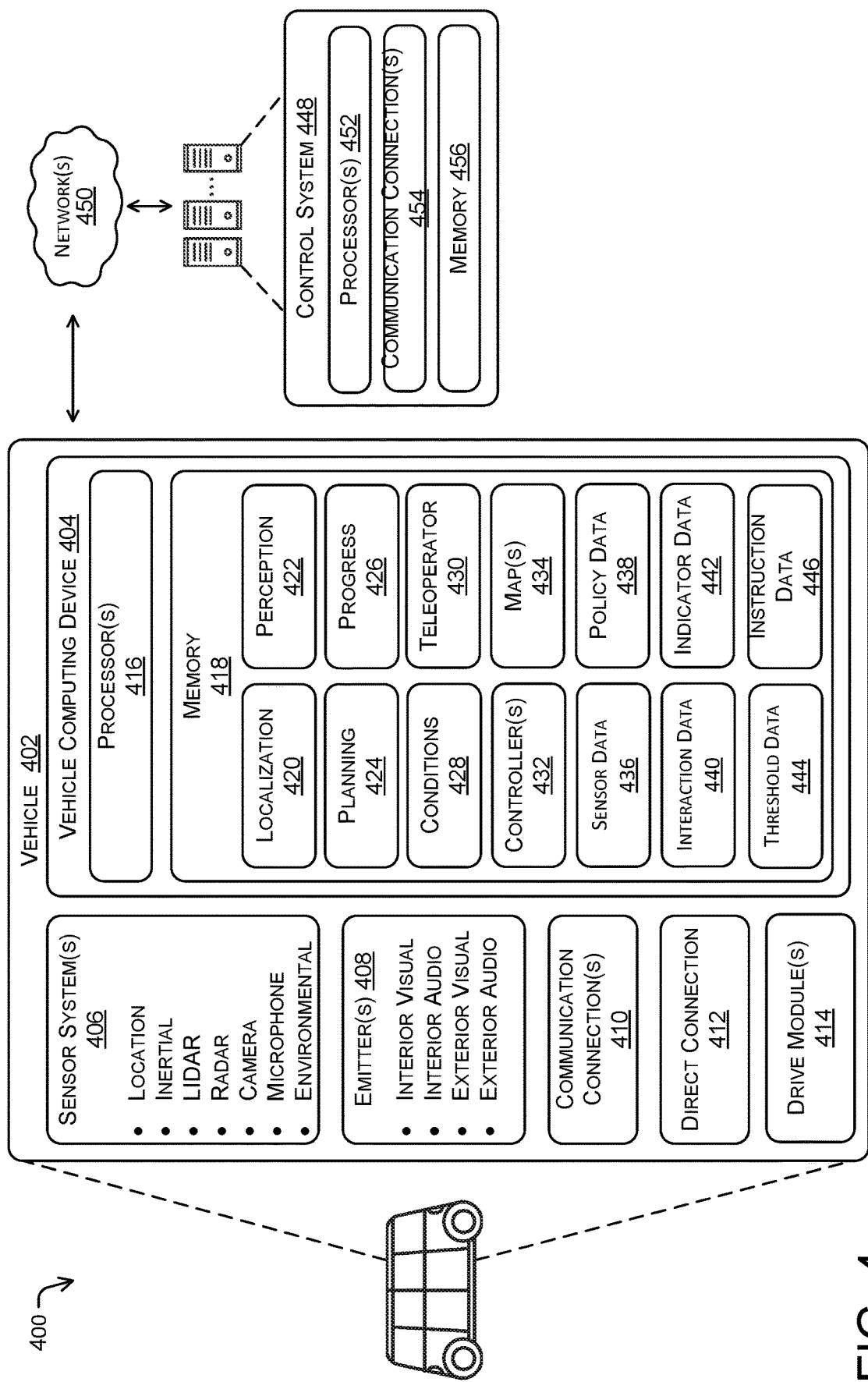
FIG. 4 depicts a block diagram of an example system for implementing the techniques described herein, in accordance with embodiments of the disclosure.

FIG. 4 depicts a block diagram of an example system 400 for implementing the techniques described herein, in accordance with embodiments of the disclosure. In at least one example, the system 400 can include a vehicle 402 (which may represent, and/or be similar to, the first autonomous vehicle 102(1), the second autonomous vehicle 102(2), the autonomous vehicle 202, and/or the autonomous vehicle 302). The vehicle 402 can include a vehicle computing device 404, one or more sensor systems 406, one or more emitters 408, one or more communication connections 410, at least one direct connection 412, and one or more drive modules 414.

The vehicle computing device 404 can include one or more processors 416 and a memory 418 communicatively coupled with the one or more processors 416. In the illustrated example, the vehicle 402 is an autonomous vehicle. However, the vehicle 402 may be any other type of vehicle (e.g., a manually driven vehicle, a semi-autonomous vehicle, etc.), or any other system having at least an image capture device. In the illustrated example, the memory 418 of the vehicle computing device 404 stores a localization component 420, a perception component 422, a planning component 424, a progress component 426, an conditions component 428, a teleoperator component 430, one or more system controllers 432, and one or more maps 434. Though depicted in FIG. 4 as residing in the memory 418 for illustrative purposes, it is contemplated that the localization component 420, the perception component 422, the planning component 424, the progress component 426, the conditions component 428, the teleoperator component 430, the one or more system controllers 432, and/or the one or more maps 434 can additionally, or alternatively, be accessible to the vehicle 402 (e.g., stored on, or otherwise accessible by, memory remote from the vehicle 402).

In at least one example, the localization component 420 can include functionality to receive sensor data 436 (which may represent, and/or be similar to, the sensor data 108 and/or the sensor data 122) from the sensor system(s) 406 and to determine a position and/or orientation of the vehicle 402 (e.g., one or more of an x-, y-, z-position, roll, pitch, or yaw). For example, the localization component 420 can include and/or request/receive a map of an environment and can continuously determine a location and/or orientation of the vehicle 402 within the map. In some instances, the localization component 420 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 402. In some instances, the localization component 420 can provide data to various components of the vehicle 402 to determine an initial position of the vehicle 402 for generating a candidate trajectory, as discussed herein.

In some instances, the perception component 422 can include functionality to perform object detection, segmentation, and/or classification. In some instances, the perception component 422 can provide processed sensor data 436 that indicates a presence of an object that is proximate to the vehicle 402 and/or a classification of the object as an object type (e.g., car, pedestrian, cyclist, animal, building, tree, road surface, curb, sidewalk, unknown, etc.). In additional and/or alternative examples, the perception component 422 can provide processed sensor data 436 that indicates one or more characteristics associated with a detected object and/or the environment in which the object is positioned. In some instances, characteristics associated with an object can include, but are not limited to, an x-position (global position), a y-position (global position), a z-position (global position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

In general, the planning component 424 can determine a path for the vehicle 402 to follow to traverse through an environment. For example, the planning component 424 can determine various routes and trajectories and various levels of detail. For example, the planning component 424 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 424 can generate an instruction for guiding the vehicle 402 along at least a portion of the route from the first location to the second location. In at least one example, the planning component 424 can determine how to guide the vehicle 402 from a first waypoint in the sequence of waypoints to a second waypoint in the sequence of waypoints. In some instances, the instruction can be a trajectory, or a portion of a trajectory. In some instances, multiple trajectories can be substantially simultaneously generated (e.g., within technical tolerances) in accordance with a receding horizon technique, wherein one of the multiple trajectories is selected for the vehicle 402 to navigate.

In at least one example, the planning component 424 can determine a pickup location associated with a location. As used herein, a pickup location can be a specific location (e.g., a parking space, a loading zone, a portion of a ground surface, etc.) within a threshold distance of a location (e.g., an address or location associated with a dispatch request) where the vehicle 402 can stop to pick up a passenger. In at least one example, the planning component 424 can determine a pickup location based at least in part on determining a user identity (e.g., determined via image recognition or received as an indication from a user device, as discussed herein). Arrival at a pickup location, arrival at a destination location, entry of the vehicle by a passenger, and receipt of a "start ride" command are additional examples of events that may be used for event-based data logging.

In some instances, the planning component 424 can further include functionality to determine when the vehicle 402 is to yield to object(s), such as other vehicle(s). For instance, the planning component 424 may use policy data 438 to determine when the vehicle 402 is to yield to the object(s). The policy data 438 may represent one or more policies that the vehicle 402 is to follow when navigating. The one or more policies may include, but are not limited to, a policy to yield to other vehicle(s) that arrive at an intersection before the vehicle 402, a policy to travel in a road lane, a policy on how to change lanes, a policy on how to stop, a policy that the vehicle 402 should not tailgate, and/or the like. As such, the planning component 424 may determine that the vehicle 402 is to yield to another vehicle when the other vehicle arrives at an intersection before the vehicle 402. Additionally, the planning component 424 may determine that the vehicle is to yield to two other vehicles when the two other vehicles arrive at an intersection before the vehicle 402.

In some instances, the planning component 424 can further include functionality to determine an interaction between the vehicle 402 and object(s), such as vehicle(s). For instance, the planning component 424 may use interaction data 440 to determine the interaction between the vehicle 402 and the object(s). The interaction data 440 may represent one or more interactions, such as, but not limited to, an interaction to follow object(s) that are located along a trajectory of the vehicle 402, an interaction not to follow object(s) that are not located along a trajectory of the vehicle 402, an interaction to yield to object(s) for which the vehicle 402 is following, and/or the like. In some instances, following may involve varying longitudinal controls of the vehicle 402 (e.g., velocity and/or acceleration) to maintain a minimum distance between the vehicle 402 and the object, wherein the minimum distance may be based, at least in part, on a relative distance and/or velocity between the vehicle 402 and the object. As such, the planning component 424 may determine that the vehicle 402 is to follow another vehicle when the other vehicle is located in the trajectory of the vehicle 402.

In some instances, the planning component 424 can further include functionality to generate indicator data 442, where the indicator data 442 represents object(s) that the vehicle 402 is currently yielding to and/or object(s) that the vehicle 402 is following. In some instances, the planning component 424 may generate the indicator data 442 each time the perception component determines that the vehicle 402 is yielding to object(s) and/or each time the planning component 424 determines that the vehicle 402 is following object(s). In other instances, the planning component 424 may generate the indicator data 442 when the vehicle 402 determines to contact the teleoperator.

In some instances, the planning component 424 includes functionality to use instruction data 446 sent by the teleoperator system 114 in order to determine how to navigate the vehicle 402. For a first example, the instruction data 446 may represent an instruction to cease yielding to object(s). Based at least in part on the instruction data 446, the planning component 424 may cause the vehicle 402 to cease yielding to the object(s) and/or determine a route for navigating the vehicle 402. For a second example, the instruction data 446 may represent an instruction to temporarily cease following one or more policies. Based at least in part on the instruction data 446, the planning component 424 may cause the vehicle 402 to temporarily cease following the one or more policies and/or determine a route for navigating the vehicle 402. For a third example, the instruction data 446 may represent an instruction to change an interaction with object(s) from "follow" to "no longer follow". Based at least in part on the instruction data 446, the planning component 424 may cause the vehicle 402 to change the interaction with the object(s) and/or determine a route for navigating around the object(s).

The progress component 426 can include functionality to determine when the progress of the vehicle 402 has been impeded. In some instances, the progress component 426 may determine that the progress of the vehicle 402 has been impeded when the vehicle 402 is not moving (e.g., a velocity of the vehicle 402 is zero miles per hour). Additionally, or alternatively, in some instances, the progress component 426 may determine that the progress of the vehicle 402 has been impeded when the vehicle 402 only navigates a give distance within a given amount of time. Additionally, or alternatively, in some instances, the progress component 426 may determine that the progress of the vehicle 402 has been impeded when the current velocity of the vehicle 402 is below a threshold velocity.

The progress component 426 can include functionality to determine when the progress of the vehicle 402 is impeded by an object. In some instances, the progress component 426 may determine that the progress of the vehicle 402 may be impeded when the vehicle 402 identifies a specific type of object located within the environment. In some instances, the progress component 426 may determine that the progress of the vehicle 402 may be impeded when the vehicle 402 identifies a specific scenario occurring within the environment. The scenario may include, but is not limited to, another vehicle merging into the drive lane of the vehicle 402, another vehicle navigating at a velocity that is below a threshold velocity (which is described below), an accident that occurs along the route of the vehicle 402, and/or the like.

In some instances, the progress component 426 can further include functionality to determine when the progress of the vehicle 402 has been impeded for a threshold amount of time, which may be represented by threshold data 444. Additionally, or alternatively, in some instances, the progress component 426 can include functionality to determine when the vehicle 402 is yielding to object(s) for a threshold amount of time. As described herein, the threshold amount of time may include, but is not limited to, three seconds, thirty seconds, one minute, three minutes, and/or any other period of time.

The conditions component 428 can include functionality to determine when one or more intervening conditions are causing the progress of the vehicle 402 to be impeded. As described herein, an intervening condition may include, but is not limited to, the vehicle 402 being stuck in traffic, the vehicle 402 being impeded because of a traffic light, and/or the like.

The teleoperator component 430 can include functionality to determine when to contact the teleoperator. In some instances, the teleoperator component 430 determines to contact the teleoperator when the progress of the vehicle 402 has been impeded for the threshold amount of time. In some instances, the teleoperator component 430 determines to contact the teleoperator when the progress of the vehicle 402 has been impeded for the threshold amount of time and an intervening condition that causes the progress of the vehicle 402 to be impeded has not occurred. Still, in some instances, the teleoperator component 430 determines to contact the teleoperator when the progress of the vehicle has been impeded by a specific type of object or specific scenario. In either instance, after determining to contact the teleoperator, the teleoperator component 430 can include functionality to cause the vehicle 402 to send at least a portion of the sensor data 436 to the teleoperator system 114. Additionally, in some instances, the teleoperator component 430 can include functionality to cause the vehicle 402 to send the indicator data 442 to the teleoperator system 114.

In at least one example, the vehicle computing device 404 can include one or more system controllers 432, which can be configured to control steering, propulsion, braking, safety, emitters, communication, and other systems of the vehicle 402. These system controller(s) 432 can communicate with and/or control corresponding systems of the drive module(s) 212 and/or other components of the vehicle 402.

The memory 418 can further include one or more maps 434 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps 434 can include at least one map (e.g., images and/or a mesh). In some example, the vehicle 402 can be controlled based at least in part on the map(s) 434. That is, the map(s) 434 can be used in connection with the localization component 420, the perception component 422, and/or the planning component 424 to determine a location of the vehicle 402, identify entities in an environment, and/or generate routes and/or trajectories to navigate within an environment.

In some instances, aspects of some or all of the components discussed herein can include any models, algorithms, and/or machine learning algorithms. For example, in some instances, the components in the memory 418 can be implemented as a neural network. As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based at least in part on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 2 (ID2), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet70, ResNet101, VGG, DenseNet, PointNet, and the like.

As discussed above, in at least one example, the sensor system(s) 406 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 can include multiple instances of each of these or other types of sensors. For instance, the lidar sensors can include individual lidar sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device 404. Additionally or alternatively, the sensor system(s) 406 can send the sensor data 436, via the one or more network(s) 450, to a control system 448 at a particular frequency, after a lapse of a predetermined period of time, upon occurrence of one or more conditions, in near real-time, etc.

The vehicle 402 can also include one or more emitters 408 for emitting light and/or sound, as described above. The emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 402 can also include one or more communication connection(s) 410 that enable communication between the vehicle 402 and one or more other local or remote computing device(s). For instance, the communication connection(s) 410 can facilitate communication with other local computing device(s) on the vehicle 402 and/or the drive module(s) 414. Also, the communication connection(s) 410 can allow the vehicle 402 to communicate with other nearby computing device(s) (e.g., other nearby vehicles, traffic signals, etc.). The communications connection(s) 410 also enable the vehicle 402 to communicate with the remote teleoperations computing devices (e.g., the teleoperator system 114) or other remote services.

The communications connection(s) 410 can include physical and/or logical interfaces for connecting the vehicle computing device 404 to another computing device or a network, such as network(s) 450. For example, the communications connection(s) 410 can enable Wi-Fi-based communication such as via frequencies defined by the IEEE 802.11 standards, short range wireless frequencies such as Bluetooth®, cellular communication (e.g., 2G, 2G, 4G, 4G LTE, 5G, etc.) or any suitable wired or wireless communications protocol that enables the respective computing device to interface with the other computing device(s).

In at least one example, the vehicle 402 can include one or more drive modules 414. In some instances, the vehicle 402 can have a single drive module 414. In at least one example, if the vehicle 402 has multiple drive modules 414, individual drive modules 414 can be positioned on opposite ends of the vehicle 402 (e.g., the front and the rear, etc.). In at least one example, the drive module(s) 414 can include one or more sensor systems to detect conditions of the drive module(s) 414 and/or the surroundings of the vehicle 402. By way of example and not limitation, the sensor system(s) 406 can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect entities in the surroundings of the drive module, lidar sensors, radar sensors, etc. Some sensors, such as the wheel encoders can be unique to the drive module(s) 414. In some cases, the sensor system(s) 406 on the drive module(s) 414 can overlap or supplement corresponding systems of the vehicle 402 (e.g., sensor system(s) 406).

The drive module(s) 414 can include many of the vehicle systems, including a high voltage battery, a motor to propel the vehicle 402, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage j unction, a high voltage cable, charging system, charge port, etc.). Additionally, the drive module(s) 414 can include a drive module controller which can receive and preprocess the sensor data 436 from the sensor system(s) 406 and to control operation of the various vehicle systems. In some instances, the drive module controller can include one or more processors and memory communicatively coupled with the one or more processors. The memory can store one or more modules to perform various functionalities of the drive module(s) 414. Furthermore, the drive module(s) 414 also include one or more communication connection(s) that enable communication by the respective drive module with one or more other local or remote computing device(s).

In at least one example, the direct connection 412 can provide a physical interface to couple the one or more drive module(s) 414 with the body of the vehicle 402. For example, the direct connection 412 can allow the transfer of energy, fluids, air, data, etc. between the drive module(s) 414 and the vehicle 402. In some instances, the direct connection 412 can further releasably secure the drive module(s) 414 to the body of the vehicle 402.

As further illustrated in FIG. 4, the control system 448 can include processor(s) 452, communication connection(s) 454, and memory 456. The processor(s) 416 of the vehicle 402 and/or the processor(s) 452 of the control system 448 (and/or other processor(s) described herein) can be any suitable processor capable of executing instructions to process data and perform operations as described herein. By way of example and not limitation, the processor(s) 416 and 452 can comprise one or more Central Processing Units (CPUs), Graphics Processing Units (GPUs), or any other device or portion of a device that processes electronic data to transform that electronic data into other electronic data that can be stored in registers and/or memory. In some instances, integrated circuits (e.g., ASICs, etc.), gate arrays (e.g., FPGAs, etc.), and other hardware devices can also be considered processors in so far as they are configured to implement encoded instructions.

The memory 418 and the memory 456 (and/or other memory described herein) are examples of non-transitory computer-readable media. The memory 418 and the memory 456 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 4 is illustrated as a distributed system, in alternative examples, components of the vehicle 402 can be associated with the control system 448 and/or components of the control system 448 can be associated with the vehicle 402. That is, the vehicle 402 can perform one or more of the functions associated with the control system 448, and vice versa.

Figure 5:
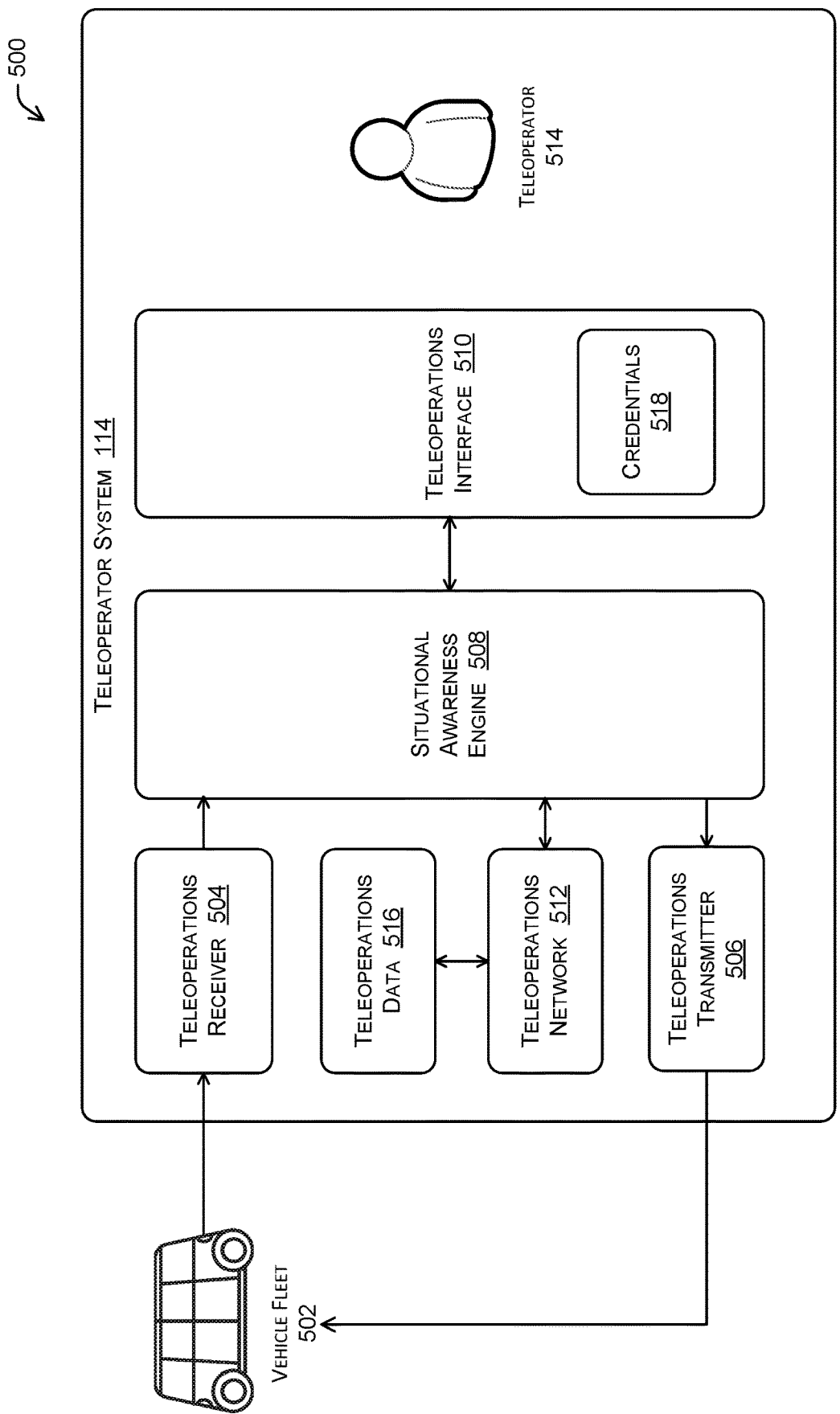
FIG. 5 is a block diagram of an example teleoperations system architecture, in accordance with embodiments of the disclosure.

FIG. 5 shows an example architecture 500 including a fleet of vehicles 502 and the teleoperator system 114. The example vehicle fleet 502 includes one or more vehicles (e.g., the vehicle 402), at least some which are communicatively coupled to the teleoperator system 114 via the communication connection(s) of the vehicles. A teleoperations receiver 504 and a teleoperations transmitter 506 associated with the teleoperator system 114 may be communicatively coupled to the respective communication connection(s) of the vehicles. For example, the vehicle 402 may send communication signals via the communication connection(s) 410, which are received by the teleoperations receiver 504. In some examples, the communication signals may include, for example, the sensor data 436, the indicator data 442, operation state data, and/or any data and/or output from one or more components of the vehicle 402m. In some examples, the sensor data 436 may include raw sensor data and/or processed sensor data, such as a subset of operation state data such as a representation of the sensor data (e.g. a bounding box). In some examples, the communication signals may include a subset of the operation state data discussed above and/or any other derived data (planning controls, etc.). In some examples, the communication signals from the vehicle 402 may include a request for assistance to the teleoperator system 114.

As shown in FIG. 5, a situational awareness engine ("SAE") 508 may obtain the communication signals from the vehicle 402 and relay at least a subset of them to a teleoperations interface 510. The SAE 508 may additionally or alternatively obtain signals generated via the teleoperations interface 510 and relay them to a teleoperations network 512 and/or transmit at least a subset of them to one or more vehicles of the vehicle fleet 502 via the teleoperations transmitter 506. The SAE 508 may additionally or alternatively obtain signals from the teleoperations network 512 and relay at least a subset of them to the teleoperations interface 510 and/or the teleoperations transmitter 506. In some examples, the teleoperations interface 510 may directly communicate with the vehicle fleet 502.

In some examples, the SAE 508 can be implemented on a device that is separate from a device that includes the teleoperations interface 510. For example, the SAE 508 can include a gateway device and an application programming interface ("API") or similar interface. In some examples, the SAE 508 includes an application interface and/or a model, such as, for example, a FSM, an ANN, and/or a DAG. In some examples, the SAE 508 is configured to determine a presentation configuration of data received from one or more elements discussed herein (e.g., the vehicle 402, the vehicle fleet 502, and/or other teleoperations interfaces) and/or input options to present to the teleoperator to provide guidance to one or more vehicles (e.g., an option to select a displayed button that confirms a trajectory determined by the vehicle).

In some examples, the teleoperations receiver 504 may be communicatively coupled to the teleoperations interface 510 via the SAE 508, and in some examples, a teleoperator 514 may be able to access the sensor data 436, the indicator data 442, the operation state data, and/or any other data in the communication signals received from the vehicle 402 via the teleoperations interface 510. In some examples, the teleoperator 514 may be able to selectively access the sensor data 436, the indicator data 442, the operation state data, and/or other data via an input device, and view the selected data via one or more displays. In some examples, such selective accessing can include transmitting a request for data from the vehicle 402 via the teleoperations transmitter 506. In some examples, the SAE 508 may present a subset or representation of the data to the teleoperator 514 via the teleoperations interface 510. As a non-limiting example, the SAE 508 may create simplistic pictorial representations, bounding boxes, arrows indicating a bearing and velocity of objects, icons representing objects, colorization of the sensor data, or other representations of the data which may simplify interpretation by a teleoperator 514.

In the example shown, the teleoperator system 114 also includes the teleoperations network 512 configured to provide communication between two or more of the teleoperations interfaces 510 and the respective teleoperators 514, and/or communication with teleoperations data 516. For example, the teleoperator system 114 may include a plurality of teleoperations interfaces 510 and respective teleoperators 514, and the teleoperators 514 may communicate with one another via the teleoperations network 512 to facilitate and/or coordinate the guidance provided to the vehicle fleet 502. In some examples, there may be a teleoperator 514 assigned to each vehicle from the vehicle fleet 502, and in some examples, a teleoperator 514 may be assigned to more than a single vehicle of the vehicle fleet 502. In some examples, more than one teleoperator 514 may be assigned to a single vehicle. In some examples, teleoperators 514 may not be assigned to specific vehicles of the vehicle fleet 502, but may instead provide guidance to vehicles that have encountered certain types of events and/or to vehicles based at least in part on, for example, a level of urgency associated with the vehicle's encounter with the event. In some examples, data associated with an event and/or the guidance provided by a teleoperator 514 may be stored by the teleoperator system 114, for example, in storage for the teleoperations data 516, and/or accessed by other teleoperators 514.

In some examples, the teleoperations data 516 may be accessible by the teleoperators 514, for example, via the teleoperations interface 510, for use in providing guidance to the vehicles 402. For example, the teleoperations data 516 may include global and/or local map data related to the road network, events associated with the road network, and/or travel conditions associated with the road network due to, for example, traffic volume, weather conditions, construction zones, and/or special events. In some examples, the teleoperations data 516 may include data associated with one more of the vehicles of the vehicle fleet 502, such as, for example, maintenance and service information, and/or operational history including, for example, event history associated with the vehicle 402, route histories, occupancy histories, and other types of data associated with the vehicle 402.

In some examples, a teleoperator 514 and/or a teleoperations interface 510 can be associated with credentials 518. For example, to activate a session at the teleoperations interface 510, the teleoperator system 114 may require the teleoperator 514 to authenticate using the credentials 518. In some examples, the credentials 518 may be inherent to the particular teleoperations interface 510. In some examples, requests for assistance with a particular permutation of operation state data (e.g., certain events) and/or a particular teleoperation option may require resolution by a teleoperations interface 510 having elevated credentials 518 (e.g., credentials with greater permissions). For example, if a teleoperator 514 selects an action at a teleoperations interface 510 that would affect the entire vehicle fleet 502 instead of just one vehicle, the action could be transmitted to a second teleoperations interface 510 that has elevated credentials associated therewith for confirmation, modification, and/or rejection. A request and/or operation state data associated with an elevated level of credentials can be used to determine a teleoperations interface 510 to which to relay the request. In some examples, the SAE 508 can relay a request and/or operation state data associated with an elevated level of credentials to multiple teleoperations interfaces 510 instead of a single teleoperations interface 510.

Figure 6:
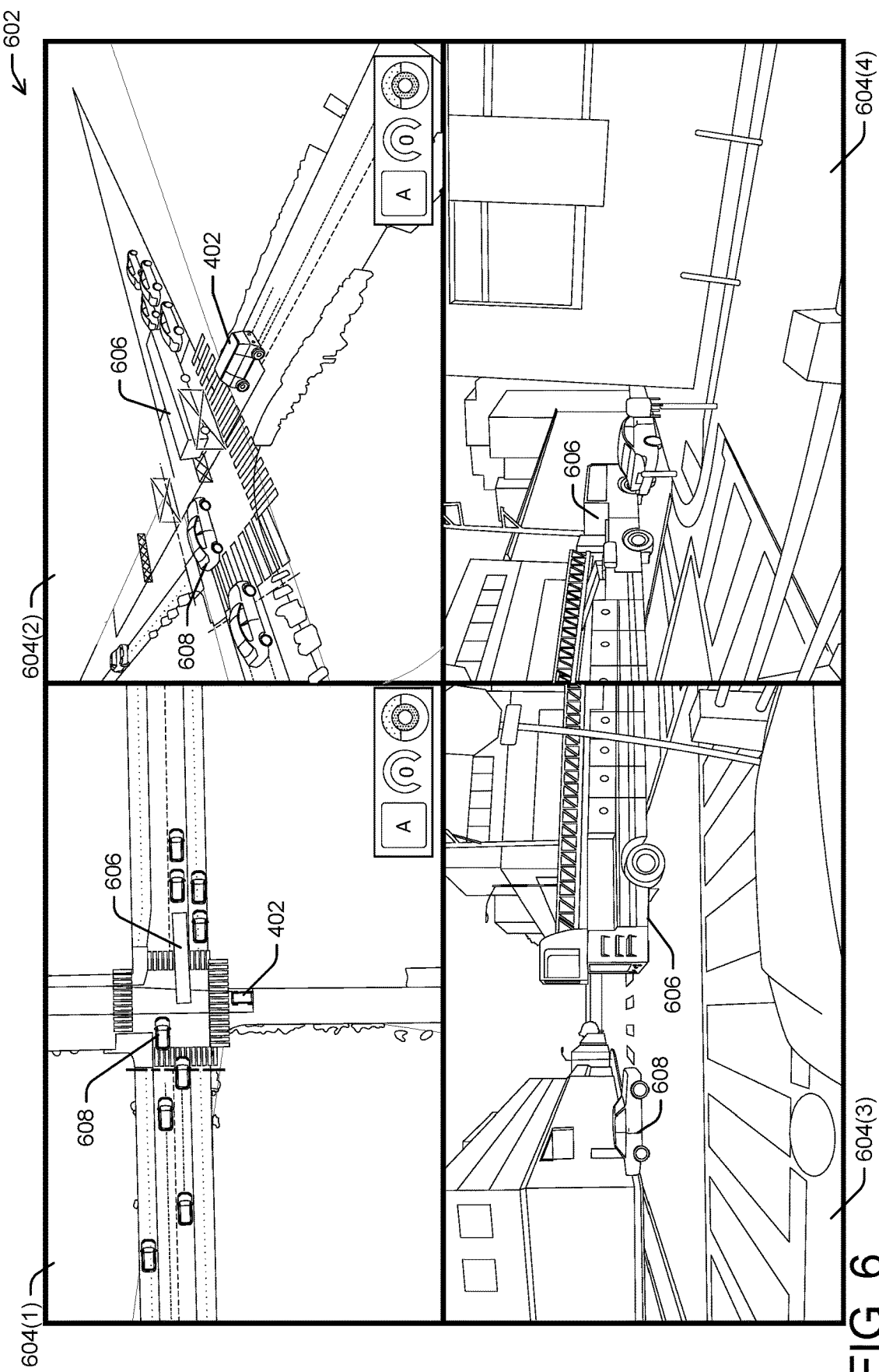
FIG. 6 is a first example user interface showing an autonomous vehicle yielding for an object, in accordance with embodiments of the disclosure.

FIG. 6 is a first example user interface 602 showing the vehicle 402 yielding for object(s), in accordance with embodiments of the disclosure. As shown, the user interface 602 includes four portions 604(1)-(4) illustrating information about the environment for which the vehicle 402 is located. For instance, the first portion 604(1) of the user interface 602 includes a first video rendered as if taken from above the vehicle 402, the second portion 604(2) of the user interface 602 includes a second video rendered as if taken from a side of the vehicle 402, the third portion 604(3) of the user interface 602 includes a third video captured by a first camera of the vehicle 402, and the fourth portion 604(4) of the user interface 602 includes a fourth video captured by a second camera of the vehicle 402. While the example of FIG. 6 illustrates the user interface 602 as including four portions 604(1)-(4), in other examples, the user interface 602 may include any number of portions.

As shown, the portions 604(1)-(2) of the user interface 602 include representations of the vehicle 402. In some instances, one or more of the portions 604(1)-(2) of the user interface 602 may include graphical element(s) indicating the vehicle 402. The graphical element(s) may include, but are not limited to, a bounding box around the vehicle 402, a shading of the vehicle 402, text describing the vehicle 402, and/or any other type graphical element that may indicate the vehicle 402. This way, the teleoperator 514 can easily identify where the vehicle 402 is located within the environment.

Additionally, the portions 604(1)-(4) of the user interface 602 include representations of the object 606 for which the vehicle 402 is yielding, which includes a crane parked at least partially within the intersection in the example of FIG. 6. In some instances, one or more of the portions 604(1)-(4) of the user interface 602 may include graphical element(s) indicating the object 606. The graphical element(s) may include, but are not limited to, a bounding box around the object 606, a shading of the object 606, text describing the object 606, and/or any other type graphical element that may indicate the object 606. This way, the teleoperator 514 can easily identify the object 606 for which the vehicle 402 is yielding.

In some instances, the teleoperator 514 can select the object 606 using the user interface 602. The teleoperator 514 can then use the user interface 602 to provide instructions for how the vehicle 402 is to proceed. For example, the teleoperator 514 can use the user interface 602 to instruct the vehicle 402 to no longer yield to the object 606. This is because, in the example of FIG. 6, the object 606 parked at least partially within the intersection and as such, is blocking the route of the vehicle 402. Therefore, the vehicle 402 may have to cease yielding to the object 606 in order to navigate around the object 606.

The vehicle 402 may receive the instructions from the teleoperator system 114 and proceed according to the instructions. For example, the vehicle 402 may determine to cease yielding to the object 606 and/or determine to temporarily cease following one or more policies with regard to the object 606. The vehicle 402 may then determine how to proceed navigating based on the one or more policies with regard to other objects located within the environment. For example, if the vehicle 402 is not yielding for another object, the vehicle 402 may then select a route such that the vehicle 402 navigates around the object 606. The vehicle 402 may then begin to navigate along the selected route. However, if the vehicle 402 is still yielding to another object, then the vehicle 402 may continue to yield for the other object before proceeding.

For example, in some instances, the vehicle 402 may be yielding to more than one object. For example, the vehicle 402 may further be yielding for a second object 608 that is located within the intersection. In such an example, the user interface 602 may include a graphical element indicating the second object 608. In some instances, the graphical element indicating the object 606 may be different than the graphical element indicating the second object 608. For example, the graphical element indicating the object 606 may tell the teleoperator 514 that the vehicle 402 is currently yielding for the object 606, and the graphical element indicating the second object 608 may tell the teleoperator 514 that the vehicle 402 will later be yielding for the second object 608 (e.g., if the second object 608 is still located within the intersection).

Figure 7:
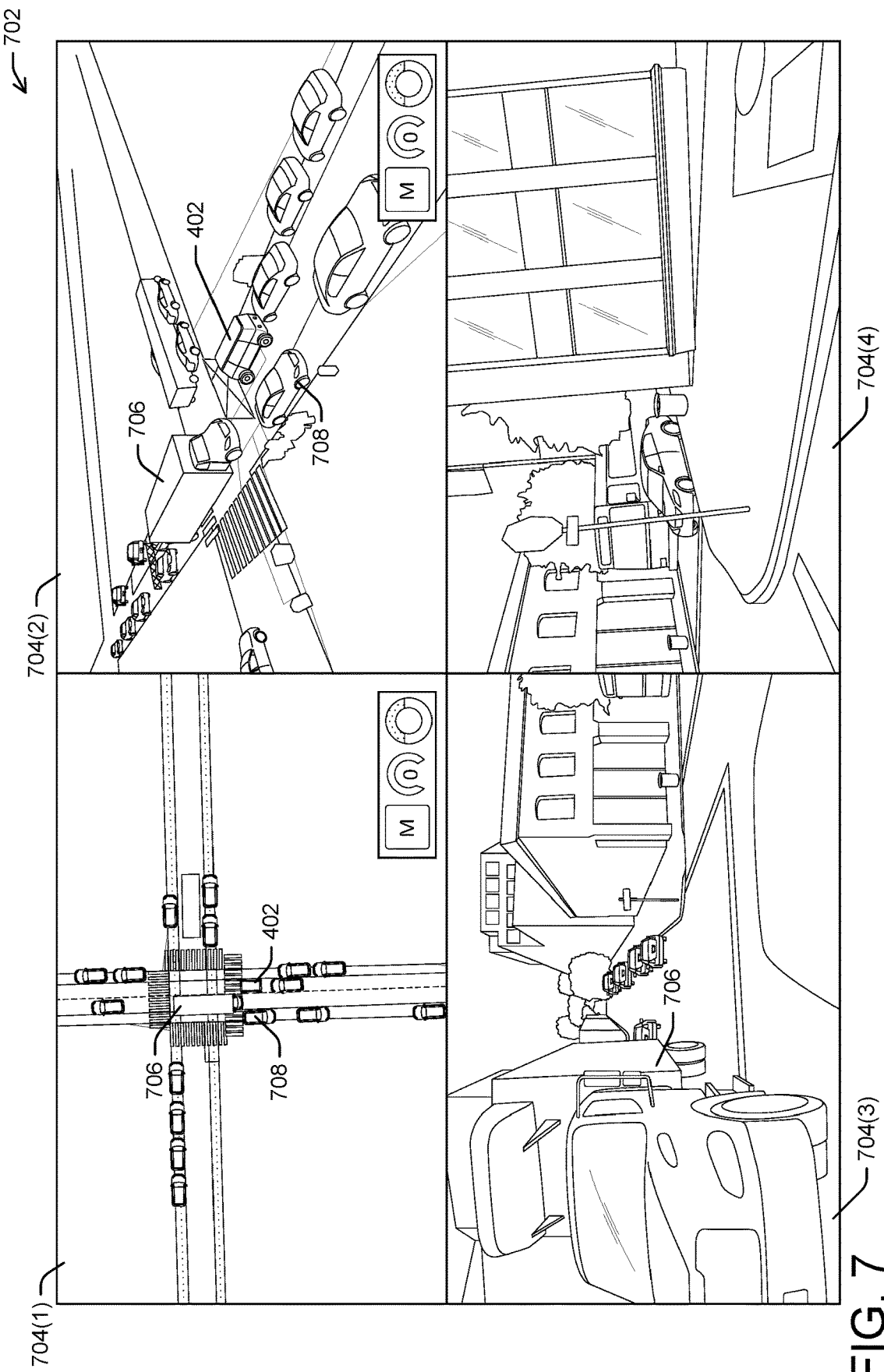
FIG. 7 is a second example user interface showing an autonomous vehicle yielding for an object, in accordance with embodiments of the disclosure.

FIG. 7 is a first example user interface 702 showing the vehicle 402 yielding for object(s), in accordance with embodiments of the disclosure. As shown, the user interface 702 includes four portions 704(1)-(4) illustrating information about the environment for which the vehicle 402 is located. For instance, the first portion 704(1) of the user interface 702 includes a first video from above the vehicle 402, the second portion 704(2) of the user interface 702 includes a second video from a side of the vehicle 402, the third portion 704(3) of the user interface 702 includes a third video captured by a first camera of the vehicle 402, and the fourth portion 704(4) of the user interface 702 includes a fourth video captured by a second camera of the vehicle 402. While the example of FIG. 7 illustrates the user interface 702 as including four portions 704(1)-(4), in other examples, the user interface 702 may include any number of portions.

As shown, the portions 704(1)-(2) of the user interface 702 include representations of the vehicle 402. In some instances, one or more of the portions 704(1)-(2) of the user interface 702 may include graphical element(s) indicating the vehicle 402. The graphical element(s) may include, but are not limited to, a bounding box around the vehicle 402, a shading of the vehicle 402, text describing the vehicle 402, and/or any other type graphical element that may indicate the vehicle 402. This way, the teleoperator 514 can easily identify where the vehicle 402 is located within the environment.

Additionally, the portions 704(1)-(3) of the user interface 702 include representations of the object 706 for which the vehicle 402 is yielding, which includes a moving truck trying to navigate past the vehicle 402 in the example of FIG. 7. In some instances, one or more of the portions 704(1)-(3) of the user interface 702 may include graphical element(s) indicating the object 706. The graphical element(s) may include, but are not limited to, a bounding box around the object 706, a shading of the object 706, text describing the object 706, and/or any other type graphical element that may indicate the object 706. This way, the teleoperator 514 can easily identify the object 706 for which the vehicle 402 is yielding.

In the example of FIG. 7, the vehicle 402 may be yielding to the object 706. However, the object 706, which is attempting to navigate in the lane next to the vehicle 402, may be unable to navigate since an object 708 is blocking at least a portion of the lane for which the object 706 is using. As such, the object 706 may be stopped in the intersection and waiting for the vehicle 402 to move in order for the object 706 to navigate around the object 708. Additionally, the vehicle 402 may be stopped and yielding for the object 706 such that the vehicle 402 will not proceed until the object 706 navigates through the intersection.

As such, and in some instances, the teleoperator 514 can select the object 706 using the user interface 702. The teleoperator 514 can then use the user interface 702 to provide instructions for how the vehicle 402 is to proceed. For example, the teleoperator 514 can use the user interface 702 to instruct the vehicle 402 to no longer yield to the object 706. This way, the vehicle 402 can begin to navigate even when the object 706 is still located within the intersection. Once the vehicle 402 begins to navigate, the object 706 will then also begin to navigate around the object 708.

Figure 8:
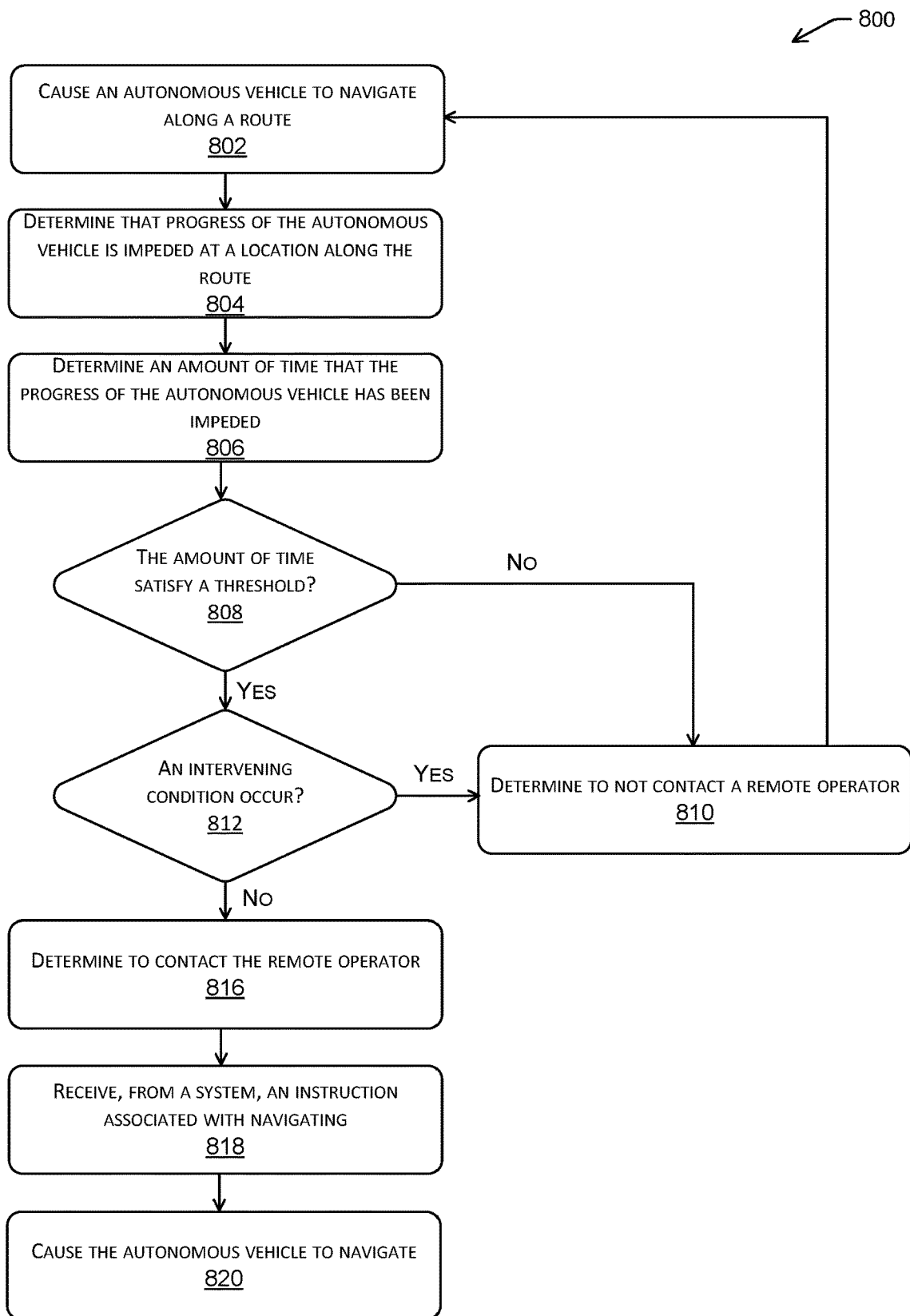
FIG. 8 depicts an example process for determining whether to contact a teleoperator, in accordance with embodiments of the present disclosure.
Figure 9:
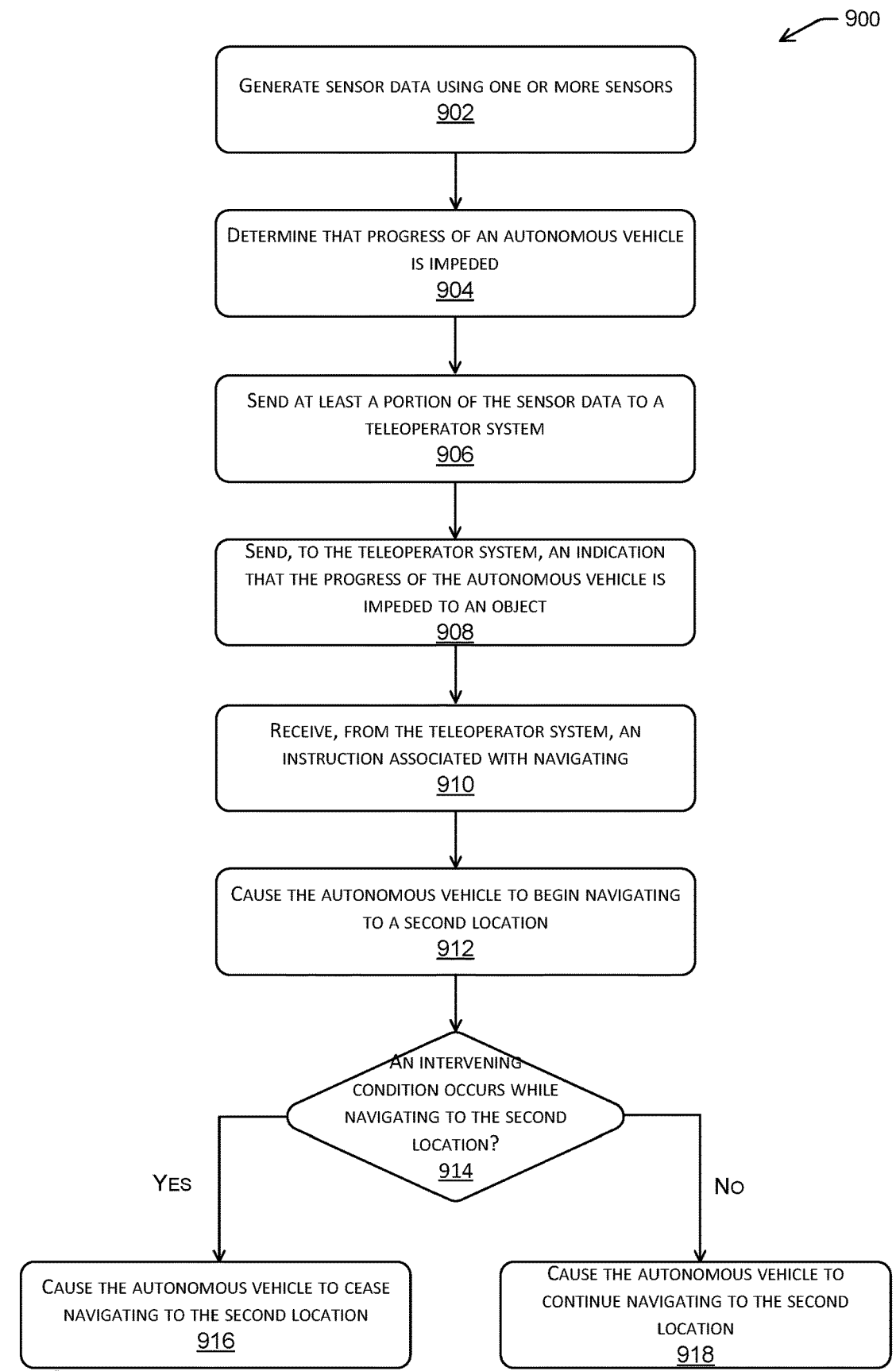
FIG. 9 depicts an example process for navigating an autonomous vehicle using instructions from a teleoperator, in accordance with embodiments of the present disclosure.

FIGS. 8-9 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 8 depicts an example process 800 for determining whether to contact a teleoperator, in accordance with embodiments of the present disclosure. At operation 802, the process 800 may include causing an autonomous vehicle to navigate along a route. For instance, the vehicle 402 may receive instructions from the control system 448, where the instructions cause the vehicle 402 to navigate along the route from a first location to a second location. Based at least in part on the instructions, the vehicle 402 may begin navigating along the route from the first location to the second location.

At operations 804, the process 800 may include determining that progress of the autonomous vehicle is impeded at a location along the route. For instance, the vehicle 402 may determine that the progress of the vehicle 402 is impeded at the location along the route. In some instances, the vehicle 402 may make the determination based on determining that the vehicle is yielding to object(s) for a threshold period of time. In some instances, the vehicle 402 may make the determination based on determining that a specific scenario is occurring around the vehicle 402. Still, in some instances, the vehicle 402 may make the determination based on determining that a specific type of object is located near the vehicle 402.

At operation 806, the process 800 may include determining an amount of time that the progress of the autonomous vehicle has been impeded. For instance, the vehicle 402 may determine the amount of time at which the progress of the vehicle 402 has been impeded.

At operations 808, the process 800 may include determining if the amount of time satisfies a threshold. For instance, the vehicle 402 may determine if the amount of time satisfies (e.g., is equal to or greater than) the threshold. If, at operation 808, the amount of time does not satisfy the threshold, then at operation 810, the process 800 may include determining not to contact a remote operator. For instance, if the vehicle 402 determines that the amount of time does not satisfy (e.g., if below) the threshold, then the vehicle 402 may determine not to contact the teleoperator 514. Additionally, the vehicle 402 may repeat operations 802-808.

However, if at operation 808, the amount of time satisfies the threshold, then at operation 812, the process 800 may include determining if an intervening condition has occurred. For instance, the vehicle 402 may determine if an intervening condition is causing the progress to be impeded. In some instances, the vehicle 402 may determine that the intervening condition has occurred when the vehicle 402 is stuck in traffic. In some instances, the vehicle 402 may determine that the intervening condition has occurred when the vehicle 402 is stopped at a traffic light.

If, at operation 812, the intervening condition has occurred, then the process 800 may determine not to contact the remote operator. For instance, if the vehicle 402 determines that the intervening condition has occurred, then the vehicle 402 may determine not to contact the teleoperator 514.

However, if at operation 812, the interviewing condition has not occurred, then at operation 814, the process 800 may include determining to contact the remote operator. For instance, if the vehicle 402 determines that the intervening condition has not occurred, then the vehicle 402 may determine to contact the teleoperator 514. Additionally, the vehicle 402 may send sensor data 436 and/or indicator data 442 to the teleoperator system 114. The teleoperator 514 may then use the sensor data 436 and/or indicator data 442 to determine how the vehicle 402 should proceed.

At operation 818, the process 800 may include receiving, from a system, an instruction associated with navigating. For instance, the vehicle 402 may receive instruction data 446 from the teleoperator system 114, where the instruction data 446 represents an instruction associated with navigating the vehicle 402. For a first example, the instruction data 446 may include an instruction to temporarily cease following the policy associated with yielding to objects that arrive at intersections before the vehicle 402. For a second example, the instruction data 446 may include an instruction to change an interaction with the object from "follow" to "do not follow". In either example, the vehicle 402 may cease yielding to the object.

At operation 820, the process 800 may include causing the autonomous vehicle to navigate. For instance, based at least in part on the instruction data 446, the vehicle 402 may begin navigating. In some instances, the vehicle 402 begins navigating since the vehicle 402 is no longer yielding to object(s). In some instances, the vehicle 402 begins navigating since the vehicle is no longer following object(s). Still, in some instances, the vehicle 402 begins navigating along the original route of the vehicle.

FIG. 9 depicts an example process 900 for navigating an autonomous vehicle using instructions from a teleoperator, in accordance with embodiments of the present disclosure. At operation 902, the process 900 may include generating sensor data using one or more sensors. For instance, the vehicle 402 may use the sensor system(s) 406 to generate the sensor data 436. The vehicle 402 may generate the sensor data 436 while navigating around an environment.

At operations 904, the process 900 may include determining that progress of the autonomous vehicle is impeded. For instance, the vehicle 402 may determine that the progress of the vehicle 402 is impeded. In some instances, the vehicle 402 may make the determination based on determining that the vehicle is yielding to object(s) for a threshold period of time. In some instances, the vehicle 402 may make the determination based on determining that a specific scenario is occurring around the vehicle 402. Still, in some instances, the vehicle 402 may make the determination based on determining that a specific type of object is located near the vehicle 402.

At operation 906, the process 900 may include sending at least a portion of the sensor data to a teleoperator system (and/or data derived therefrom). For instance, the vehicle 402 may send the at least the portion of the sensor data 436 to the teleoperator system 114. The at least the portion of the sensor data 436 may represent at least the object causing the progress to be impeded. In some instances, the vehicle 402 sends the at least the portion of the sensor data 436 based at least in part on determining that progress of the vehicle 402 has been impeded for a threshold amount of time.

At operation 908, the process 900 may include sending, to the teleoperator system, an indication that the progress of the autonomous vehicle is impeded to an object. For instance, the vehicle 402 may send indicator data 442 to the teleoperator system 114, where the indicator data 442 indicates that the progress of the vehicle 402 is impeded to the object. In some instances, the indicator data 442 may further indicate the amount of time that the vehicle 402 has been impeded to the object.

At operation 910, the process 800 may include receiving, from the teleoperator system, an instruction associated with navigating. For instance, the vehicle 402 may receive instruction data 446 from the teleoperator system 114, where the instruction data 446 represents an instruction associated with navigating the vehicle 402. For a first example, the instruction data 446 may include an instruction to temporarily cease following the policy associated with yielding to objects that arrive at intersections before the vehicle 402. For a second example, the instruction data 446 may include an instruction to change an interaction with the object from "follow" to "do not follow". In either example, the vehicle 402 may cease yielding to the object.

At operation 912, the process 900 may include causing the autonomous vehicle to navigate to a second location. For instance, based at least in part on the instruction data 446, the vehicle 402 may begin navigating to the second location. In some instances, the vehicle 402 begins navigating since the vehicle 402 is no longer yielding to object(s). In some instances, the vehicle 402 begins navigating since the vehicle is no longer following object(s). Still, in some instances, the vehicle 402 begins navigating along the original route of the vehicle.

At operation 914, the process 900 may include determining if an intervening condition occurs while navigating to the second location. For instance, the vehicle 402 may use the sensor data 436 to determine if the intervening condition occurs after beginning to navigate to the second location. In some instances, the intervening condition may include the object beginning to move. In some instances, the intervening condition may include the object moving outside of a designated area associated with the object.

If, at operation 914, the intervening condition occurs, then at operation 916, the process 900 may include causing the autonomous vehicle to cease navigating to the second location. For instance, if the vehicle 402 determines that the intervening condition occurs, then the vehicle 402 may cease navigating to the second location. In some instances, the vehicle 402 may stop. In some instances, the vehicle 402 may change an interaction with the object from "do not follow" to "follow".

However, if at operation 914, the intervening condition does not occur, then at operation 918, the process 900 may include causing the autonomous vehicle to continue navigating to the second location. For instance, if the vehicle 402 determines that the intervening condition did not occur, then the vehicle 402 will continue to navigate to the second location.

EXAMPLE CLAUSES

A: An autonomous vehicle comprising: one or more network components; one or more sensors; one or more processors; and memory storing instructions that, when executed by the one or more processors, configure the autonomous vehicle to perform operations comprising: causing the autonomous vehicle to navigate along a route; receiving sensor data generated by the one or more sensors; determining, based at least in part on the sensor data, that a progress of the autonomous vehicle is impeded by an object; determining, based at least in part on the progress being impeded by the object, whether to contact a remote operator; receiving, from one or more computing devices associated with the remote operator, an instruction associated with navigating by the object comprising information configured to alter a policy associated with the object; and causing, based at least in part on the instruction, the autonomous vehicle to navigate by the object.

B: The autonomous vehicle as recited in paragraph A, the operations further comprising sending, using the one or more network components: at least a portion of the sensor data to the one or more computing devices; and an indication that the object is impeding the progress of the autonomous vehicle.

C: The autonomous vehicle as recited in either of paragraphs A or B, wherein the determining that the progress of the autonomous vehicle is impeded by the object comprises determining, based at least in part on the sensor data, that the autonomous vehicle is yielding to the object for a threshold period of time.

D: The autonomous vehicle as recited in any of paragraphs A-C, wherein the determining that the progress of the autonomous vehicle is impeded by the object comprises: determining, based at least in part on the sensor data, that the object includes a type of object; and determining that the object is located along the route.

E: The autonomous vehicle as recited in any of paragraphs A-D, wherein the determining that the progress of the autonomous vehicle is impeded comprises determining, based at least in part on the sensor data, that a scenario is occurring, the scenario including at least one of: a velocity of the object being below a threshold velocity; or the object switching from a first drive lane to a second drive lane, wherein the autonomous vehicle is navigating in the second drive lane.

F: The autonomous vehicle as recited in any of paragraphs A-E, the operations further comprising: determining whether an intervening condition is occurring, the intervening condition including at least one of: the autonomous vehicle being stuck in traffic; or the autonomous vehicle being stopped at a traffic light, and wherein the determining whether to contact the remote operator is further based at least in part on the determining whether the intervening condition is occurring.

G: A method comprising: receiving sensor data generated by one or more sensors of an autonomous vehicle; determining, based at least in part on the sensor data, that progress of the autonomous vehicle is impeded by an object; based at least in part on the progress of the autonomous vehicle being impeded by the object, determining whether to contact a remote operator; and receiving, from the remote operator, one or more instructions configured to cause the autonomous vehicle to alter a policy with respect to the object.

H: The method as recited in paragraph G, further comprising sending at least one of: at least a portion of the sensor data to one or more computing devices associated with the remote operator; or an indication of the object to the one or more computing devices.

I: The method as recited in either of paragraphs G or H, wherein the determining that the progress of the autonomous vehicle is impeded by the object comprises determining, based at least in part on the sensor data, that the autonomous vehicle is yielding to the object for a threshold period of time.

J: The method as recited in any of paragraphs G-I, wherein the determining that the progress of the autonomous vehicle is impeded by the object comprises: determining, based at least in part on the sensor data, that the object includes a type of object; and determining that the object is located along the route.

K: The method as recited in any of paragraphs G-J, wherein the determining that the progress of the autonomous vehicle is impeded comprises determining, based at least in part on the sensor data, that a scenario is occurring, the scenario including at least one of: a velocity of the object being below a threshold velocity; or the object switching from a first drive lane to a second drive lane, wherein the autonomous vehicle is navigating in the second drive lane.

L: The method as recited in any of paragraphs G-K, further comprising: determining whether an intervening condition is occurring, the intervening condition including at least one of: the autonomous vehicle being stuck in traffic; or the autonomous vehicle being stopped at a traffic light, and wherein the determining whether to contact the remote operator is further based at least in part on the determining whether the intervening condition is occurring.

M: The method as recited in any of paragraphs G-L, further comprising sending, to one or more computing devices associated with the remote operator, policy data indicating a policy that is causing the progress of the autonomous vehicle to be impeded by the object.

N: The method as recited in any of paragraphs G-M, further comprising: receiving, from one or more computing devices associated with the remote operator, an instruction to temporarily cease following the policy for the object; and determining to temporarily cease following the policy for the object.

O: A non-transitory computer-readable media storing instructions that, when executed by one or more processors, cause one or more computing devices to perform operations comprising: receiving sensor data generated by one or more sensors of an autonomous vehicle; determining, based at least in part on the sensor data, that an object has caused progress of the autonomous vehicle to be impeded; based at least in part on the object causing the progress of the autonomous vehicle to be impeded, determining whether to contact a remote operator; and receiving, from the remote operator, instructions configured to cause the autonomous vehicle to alter one or more policies associated with the object.

P: The non-transitory computer-readable media as recited in paragraph O, the operations further comprising sending at least one of: at least a portion of the sensor data to one or more computing devices associated with the remote operator; or an indication of the object to the one or more computing devices.

Q: The non-transitory computer-readable media as recited in either of paragraphs O or P, wherein the determining that the object has caused the progress of the autonomous vehicle to be impeded comprises determining, based at least in part on the sensor data, that the autonomous vehicle is yielding to the object for a threshold period of time.

R: The non-transitory computer-readable media as recited in any of paragraphs O-Q, wherein the determining that the object has caused the progress of the autonomous vehicle to be impeded comprises: determining, based at least in part on the sensor data, that the object includes a type of object; and determining that the object is located along the route.

S: The non-transitory computer-readable media as recited in any of paragraphs O-R, wherein the determining that the object has caused the progress of the autonomous vehicle to be impeded comprises determining, based at least in part on the sensor data, that a scenario is occurring, the scenario including at least one of: a velocity of the object being below a threshold velocity; or the object switching from a first drive lane to a second drive lane, wherein the autonomous vehicle is navigating in the second drive lane.

T: The non-transitory computer-readable media as recited in any of paragraphs O-S, the operations further comprising: determining whether an intervening condition is occurring, the intervening condition including at least one of: the autonomous vehicle being stuck in traffic; or the autonomous vehicle being stopped at a traffic light, and wherein the determining whether to contact the remote operator is further based at least in part on the determining whether the intervening condition is occurring.

U: An autonomous vehicle comprising: a sensor; one or more processors; and memory storing instructions that, when executed by the one or more processors, configure the autonomous vehicle to perform operations comprising: receiving sensor data from the sensor at a first location; determining, based at least in part on the sensor data, that progress of the autonomous vehicle is impeded by an object; transmitting at least a portion of the sensor data to one or more computing devices associated with a remote operator; transmitting an indication that the progress of autonomous vehicle is impeded by the object; receiving an instruction associated with navigating the autonomous vehicle; and based at least in part on the instruction, causing the autonomous vehicle to begin navigating from the first location to a second location along the route.

V: The autonomous vehicle as recited in paragraph U, the operations further comprising: determining, while navigating to the second location, that the object begins moving; and based at least in part on the determining that the object begins moving, causing the autonomous vehicle to yield to the object.

W: The autonomous vehicle as recited in either of paragraphs U or V, the operations further comprising: receiving, from the one or more computing devices, an additional indication of an area that surrounds the object; determining, while navigating to the second location, that the object is located outside of the area; and based at least in part on the object being located outside of the area, causing the autonomous vehicle to yield to the object.

X: The autonomous vehicle as recited in any of paragraphs U-W, the operations further comprising: storing data representing one or more policies associated with navigating the autonomous vehicle, the one or more policies including at least one of: a first policy to yield to objects that arrive at an intersection before the autonomous vehicle; or a second policy to stay in a driving lane when navigating; and based at least in part on the instruction, determining to temporarily forego following at least one of the one or more policies.

Y: The autonomous vehicle as recited in any of paragraphs U-X, the operations further comprising: setting a first action associated with the object, the first action being to follow the object; and based at least in part on the instruction, setting a second action associated with the object, the second action being to cease following the object.

Z: The autonomous vehicle as recited in any of paragraphs U-Y, the operations further comprising: determining, based at least in part on the instruction, to temporarily cease yielding to the object; and determining, based at least in part on one or more policies, whether to yield to one or more other objects, and wherein the causing the autonomous vehicle to begin navigating from the first location to the second location along the route is based at least in part on determining not to yield to the one or more other objects.

AA: A method comprising: receiving sensor data from a sensor on a vehicle; determining, based at least in part on the sensor data, that progress of the vehicle along a route is impeded by an object in the environment; determining whether to contact a remote operator; transmitting, based at least in part on determining whether to contact the remote operator, one or more of at least a portion of the sensor data, a representation of the sensor data associated with the object, or an indication that the object is impeding progress to one or more computing devices associated with the remote operator; receiving, from the one or more computing devices, an instruction altering a policy associated with the object; and based at least in part on the instruction, causing the autonomous vehicle to navigate to a location.

AB: The method as recited in paragraph AA, wherein: the indication comprises data identifying that the vehicle is yielding to the object; and the altering the policy comprises instructing the vehicle to stop yielding to the object.

AC: The method as recited in either of paragraphs AA or AB, further comprising: determining, while navigating to the location, that the object begins moving; and based at least in part on the determining that the object begins moving, causing the vehicle to yield to the object.

AD: The method as recited in any of paragraphs AA-AC, further comprising: receiving, from the one or more computing devices, an area that surrounds the object; determining, while navigating to the location, that the object is located outside of the area; and based at least in part on the object being located outside of the area, causing the vehicle to yield to the object.

AE: The method as recited in any of paragraph AA-AD, wherein the policy comprises at least one of: a first policy to yield to objects that arrive at an intersection before the vehicle, or a second policy to stay in a driving lane when navigating, and wherein altering the policy comprises determining to temporarily forego following at least one of the first policy or second policy.

AF: The method as recited in any of paragraphs AA-AE, further comprising, after navigating to the location, determining to again follow the first or second policies.

AG: The method as recited in any of paragraphs AA-AF, further comprising: setting a first action associated with the object, the first action being to follow the object, wherein altering the policy comprises setting a second action associated with the object, the second action being to cease following the object.

AH: The method as recited in any of paragraphs AA-AG, further comprising determining whether to impede progress of the autonomous vehicle to another object based at least in part on the progress.

AI: One or more non-transitory computer-readable media storing instructions that, when executed by one or more processors, cause one or more computing devices to perform operations comprising: receiving sensor data from a sensor on a vehicle; determining, based at least in part on the sensor data, that an object has caused the vehicle to be impeded from navigating to a location; transmitting at least a portion of the sensor data to one or more computing devices associated with a remote operator; receiving, from the one or more computing devices, an instruction to alter a policy with respect to the object; and based at least in part on the instruction, causing the vehicle to navigate to the location.

AJ: The one or more non-transitory computer-readable media as recited in paragraph AI, the operations further comprising transmitting, to the one or more computing devices, an indication that the object has caused the autonomous vehicle to be impeded from navigating to the location.

AK: The one or more non-transitory computer-readable media as recited in either of paragraphs AI or AJ, the operations further comprising: determining, while navigating to the location, that the object begins moving; and based at least in part on the determining that the object begins moving, causing the vehicle to ignore the instruction.

AL: The one or more non-transitory computer-readable media as recited in any of paragraphs AI-AK, the operations further comprising: receiving, from the one or more computing devices, an area associated with the object; determining, while navigating to the location, that the object is located outside of the area; and based at least in part on the object being located outside of the area, causing the autonomous vehicle to ignore the instruction.

AM: The one or more non-transitory computer-readable media as recited in any of paragraphs AI-AL, wherein the policy comprises one or more of: a first policy to yield to objects that arrive at an intersection before the autonomous vehicle, or a second policy to stay in a driving lane when navigating, and the operations further comprise, based at least in part on the instruction, determining to temporarily forego following at least one of the one or more policies.

AN: The one or more non-transitory computer-readable media as recited in any of paragraphs AI-AM, the operations further comprising: setting a first action associated with the object, the first action being to follow the object; and based at least in part on the instruction, setting a second action associated with the object, the second action being to cease following the object.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. An autonomous vehicle comprising:
   one or more network components;
   one or more sensors;
   one or more processors; and
   memory storing instructions that, when executed by the one or more processors, configure the autonomous vehicle to perform operations comprising:
     causing the autonomous vehicle to navigate along a route;
     receiving sensor data generated by the one or more sensors;

determining, based at least in part on the sensor data, that a progress of the autonomous vehicle is impeded by an object;

determining, based at least in part on the progress being impeded by the object, whether to contact a remote operator;

receiving, using the one or more network components and from one or more computing devices associated with the remote operator, an instruction associated with navigating by the object comprising information configured to alter a policy associated with the object; and causing, based at least in part on the instruction, the autonomous vehicle to navigate by the object.

2. The autonomous vehicle as recited in claim 1, the operations further comprising sending, using the one or more network components:

at least a portion of the sensor data to the one or more computing devices; and an indication that the object is impeding the progress of the autonomous vehicle.

3. The autonomous vehicle as recited in claim 1, wherein the determining that the progress of the autonomous vehicle is impeded by the object comprises determining, based at least in part on the sensor data, that the autonomous vehicle is yielding to the object for a threshold period of time.

4. The autonomous vehicle as recited in claim 1, wherein the determining that the progress of the autonomous vehicle is impeded by the object comprises:

determining, based at least in part on the sensor data, that the object includes a type of object; and determining that the object is located along the route.

5. The autonomous vehicle as recited in claim 1, wherein the determining that the progress of the autonomous vehicle is impeded by the object comprises determining, based at least in part on the sensor data, that a scenario is occurring, the scenario including at least one of:

a velocity of the object being below a threshold velocity; or the object switching from a first drive lane to a second drive lane, wherein the autonomous vehicle is navigating in the second drive lane.

6. The autonomous vehicle as recited in claim 1, the operations further comprising:

determining whether an intervening condition is occurring, the intervening condition including at least one of:
the autonomous vehicle being stuck in traffic; or
the autonomous vehicle being stopped at a traffic light,
and wherein the determining whether to contact the remote operator is further based at least in part on the determining whether the intervening condition is occurring.

7. A method comprising:

receiving sensor data generated by one or more sensors of an autonomous vehicle;

determining, based at least in part on the sensor data, that progress of the autonomous vehicle is impeded by an object;

based at least in part on the progress of the autonomous vehicle being impeded by the object, determining whether to contact a remote operator;

receiving, from one or more computing devices associated with the remote operator, one or more instructions configured to cause the autonomous vehicle to alter a policy with respect to the object; and causing, based at least in part on the one or more instructions, the autonomous vehicle to navigate.

8. The method as recited in claim 7, further comprising sending at least one of:

at least a portion of the sensor data to the one or more computing devices associated with the remote operator; or an indication of the object to the one or more computing devices.

9. The method as recited in claim 7, wherein the determining that the progress of the autonomous vehicle is impeded by the object comprises determining, based at least in part on the sensor data, that the autonomous vehicle is yielding to the object for a threshold period of time.

10. The method as recited in claim 7, wherein the determining that the progress of the autonomous vehicle is impeded by the object comprises:

determining, based at least in part on the sensor data, that the object includes a type of object; and determining that the object is located along the route.

11. The method as recited in claim 7, wherein the determining that the progress of the autonomous vehicle is impeded by the object comprises determining, based at least in part on the sensor data, that a scenario is occurring, the scenario including at least one of:

a velocity of the object being below a threshold velocity; or the object switching from a first drive lane to a second drive lane, wherein the autonomous vehicle is navigating in the second drive lane.

12. The method as recited in claim 7, further comprising:

determining whether an intervening condition is occurring, the intervening condition including at least one of:
the autonomous vehicle being stuck in traffic; or
the autonomous vehicle being stopped at a traffic light,
and wherein the determining whether to contact the remote operator is further based at least in part on the determining whether the intervening condition is occurring.

13. The method as recited in claim 7, further comprising sending, to the one or more computing devices associated with the remote operator, policy data indicating a policy that is causing the progress of the autonomous vehicle to be impeded by the object.

14. A non-transitory computer-readable media storing instructions that, when executed by one or more processors, cause one or more computing devices to perform operations comprising:

receiving sensor data generated by one or more sensors of an autonomous vehicle;

determining, based at least in part on the sensor data, that an object has caused progress of the autonomous vehicle to be impeded;

based at least in part on the object causing the progress of the autonomous vehicle to be impeded, determining whether to contact a remote operator;

receiving, from one or more computing devices associated with the remote operator, instructions configured to cause the autonomous vehicle to alter one or more policies associated with the object; and causing, based at least in part on the instructions, the autonomous vehicle to navigate.

15. The non-transitory computer-readable media as recited in claim 14, the operations further comprising sending at least one of:

at least a portion of the sensor data to the one or more computing devices associated with the remote operator; or an indication of the object to the one or more computing devices.

16. The non-transitory computer-readable media as recited in claim 14, wherein the determining that the object has caused the progress of the autonomous vehicle to be impeded comprises determining, based at least in part on the sensor data, that the autonomous vehicle is yielding to the object for a threshold period of time.

17. The non-transitory computer-readable media as recited in claim 14, wherein the determining that the object has caused the progress of the autonomous vehicle to be impeded comprises:
   determining, based at least in part on the sensor data, that the object includes a type of object; and
   determining that the object is located along the route.

18. The non-transitory computer-readable media as recited in claim 14, wherein the determining that the object has caused the progress of the autonomous vehicle to be impeded comprises determining, based at least in part on the sensor data, that a scenario is occurring, the scenario including at least one of:
   a velocity of the object being below a threshold velocity; or
   the object switching from a first drive lane to a second drive lane, wherein the autonomous vehicle is navigating in the second drive lane.

19. The method as recited in claim 7, further comprising:
   identifying the object based at least in part on the sensor data; and
   associating the object with the policy.

20. The method as recited in claim 7, further comprising altering the policy with respect to the object by at least one of:
   determining to no longer yield to the object; or
   determining to no longer maintain a lane in order to navigate around the object.

* * * * *